United States Patent [19]

Dubey et al.

[11] Patent Number: 5,724,565
[45] Date of Patent: Mar. 3, 1998

[54] METHOD AND SYSTEM FOR PROCESSING FIRST AND SECOND SETS OF INSTRUCTIONS BY FIRST AND SECOND TYPES OF PROCESSING SYSTEMS

[75] Inventors: Pradeep Kumar Dubey, White Plains, N.Y.; Charles Roberts Moore; Terence Matthew Potter, both of Austin, Tex.

[73] Assignee: International Business Machines Corporation, Armonk, N.Y.

[21] Appl. No.: 383,282

[22] Filed: Feb. 3, 1995

[51] Int. Cl.$^6$ .................................................. G06F 9/30
[52] U.S. Cl. ............................................ 395/595; 395/376
[58] Field of Search ................................ 395/375, 595, 395/376

[56] References Cited

U.S. PATENT DOCUMENTS

| | | |
|---|---|---|
| 4,937,783 | 6/1990 | Lee . |
| 4,953,078 | 8/1990 | Petit . |
| 4,974,154 | 11/1990 | Matsuo . |
| 4,974,155 | 11/1990 | Dulong et al. . |
| 5,040,107 | 8/1991 | Duxbury et al. . |
| 5,165,025 | 11/1992 | Lass . |
| 5,230,068 | 7/1993 | Van Dyke et al. . |
| 5,265,213 | 11/1993 | Weiser et al. . |
| 5,287,467 | 2/1994 | Blaner et al. . |
| 5,297,281 | 3/1994 | Emma et al. . |
| 5,353,418 | 10/1994 | Nikhil et al. . |
| 5,353,419 | 10/1994 | Touch et al. . |
| 5,361,337 | 11/1994 | Okin ....................................... 395/509 |

FOREIGN PATENT DOCUMENTS

| | | |
|---|---|---|
| 0514697A2 | 11/1992 | European Pat. Off. . |
| 53-081033 | 7/1978 | Japan . |
| 2-287626 | 11/1990 | Japan . |
| 3-129432 | 6/1991 | Japan . |
| 4-033021 | 2/1992 | Japan . |
| 5-224926 | 9/1993 | Japan . |
| 5-224927 | 9/1993 | Japan . |
| 2285322 | 5/1995 | United Kingdom . |

OTHER PUBLICATIONS

PowerPC Architecture, Customer Reorder No. 52G7487, IBM Corporation, M/S 04TS-1310, 11400 Burnet Road, Austin, Texas 78758-3493.

PowerPC and Power 2: Technical Aspects of the New IBM RISC System/6000, SA23-2737-00, IBM Corporation, 11400 Burnet Road, Austin, Texas 78758-3493.

R. Cytron, J. Ferrante, B. Rosen, M. Wegman and F. Zadeck, "Efficiently Computing Static Single Assignment Form and the Control Dependence Graph", ACM Transactions on Programming Languages and Systems, vol. 13, No. 4, October 1991, pp. 451–490.

M. Lam, B. Wilson, "Limits of Control Flow on Parallelism", Proc. of the 19th Annual International Symposium on Computer Architecture, May 1992, pp. 46–57.

P. Hsu, E. Davidson, "Highly Concurrent Scalar Processing", Proc. 13th Annual Symposium on Computer Architecture, Jun. 1986, pp. 386–395.

M. Smith, M. Horowitz, M. Lam, "Efficient Superscalar Performance Through Boosting", Fifth International Conference on Architectural Support for Programming Languages and Operating Systems, Sep. 1992, pp. 248–259.

*Primary Examiner*—Krisna Lim
*Attorney, Agent, or Firm*—Michael A. Davis, Jr.

[57] ABSTRACT

A method and system are provided for processing instruction threads. Execution is initiated by a processing system of a first set of instructions including a particular instruction. The particular instruction includes an indication of a second set of instructions. In response to execution of the particular instruction and to the processing system being of a first type, the processing system continues executing the first set while initiating execution of the second set. In response to execution of the particular instruction and to the processing system being of a second type, the processing system continues executing the first set without initiating execution of the second set.

16 Claims, 16 Drawing Sheets

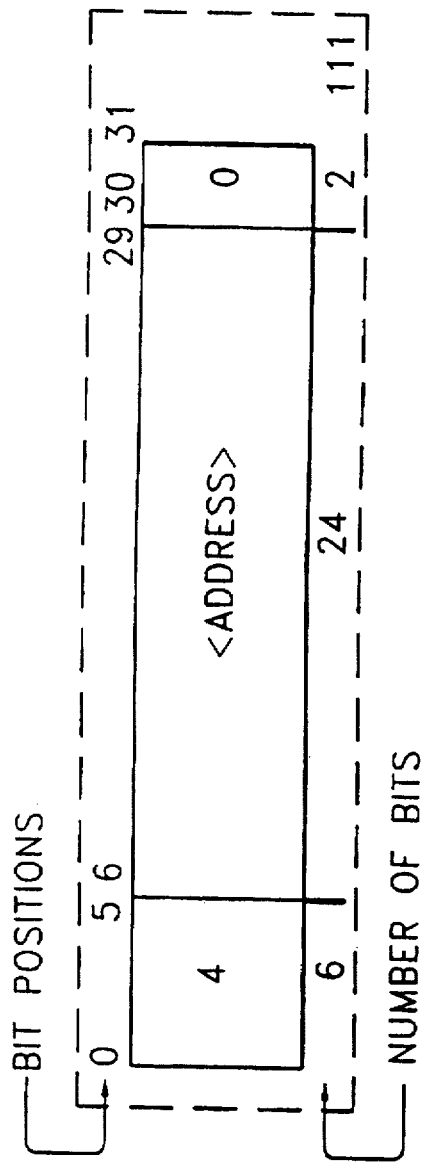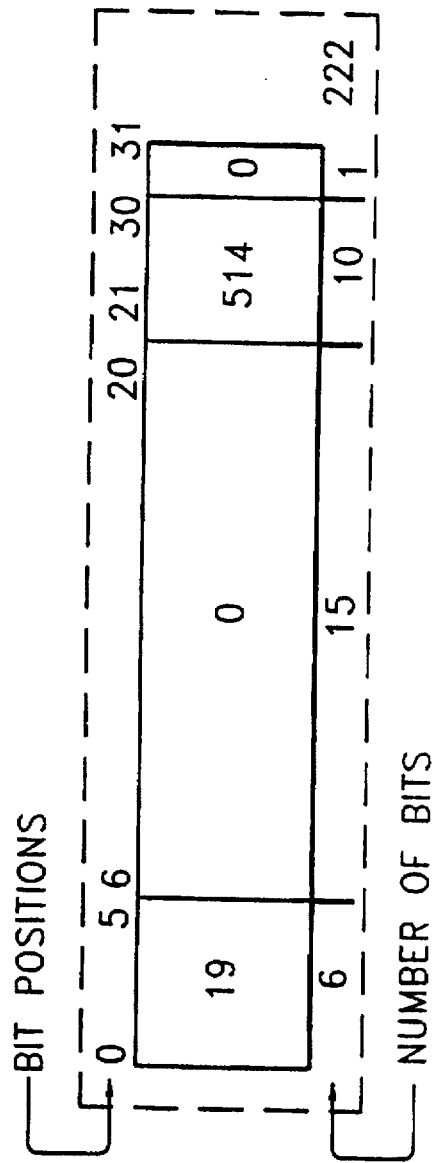

METHOD AND SYSTEM FOR PROCESSING FIRST AND SECOND SETS OF INSTRUCTIONS BY FIRST AND SECOND TYPES OF PROCESSING SYSTEMS

CROSS-REFERENCES TO RELATED APPLICATIONS

This patent application is related to coassigned copending U.S. patent application Ser. No. 08/383,331, entitled Executing Speculative Parallel Instruction Threads, by Dubey et al., filed concurrently herewith, which is hereby fully incorporated by reference herein.

TECHNICAL FIELD

This patent application relates in general to information processing systems and in particular to a method and system for processing instruction threads.

BACKGROUND OF THE INVENTION

Commercially available microprocessors currently have a uniprocessor architecture. This architecture may include one or more functional units (branch unit, load/store unit, integer arithmetic unit, floating-point arithmetic unit, etc.) that share a common set of architecturally visible registers. (A register is considered architecturally visible if it is accessible to the assembly level programmer of the processor or to the compiler of the processor that translates a higher level program to the assembly level of the machine.)

In computer systems, instructions generated using a compiler or assembly programmer, are placed in a sequence in an instruction memory, prior to run time, from where they can be fetched for execution. This sequence is called the static order. A dynamic order is the order in which the computer executes these instructions. The dynamic order may or may not be the static order. (In the discussion to follow, the phrase compile time is used to refer to the timing of any prior-to-run-time processing. Note however that although such a processing is very likely to be carried out by a compiler, other means, such as, assembly level programming, could also be employed instead.)

Prior art scalar computers, i.e., non-superscalar computers, or machines that execute instructions one at a time, have a unique dynamic order of execution that is called the sequential trace order. Let an instruction A precede another instruction B in the sequential trace order. Such an instruction A is also referred to as an earlier instruction with respect to B. These computers execute instructions in their static order until a control instruction is encountered. At this point instructions may be fetched from a (non-consecutive) location that is out of the original sequential order. Then instructions are again executed in the static sequential order until the next control instruction is encountered. Control instructions are those instructions that have the potential of altering the sequential instruction fetch by forcing the future instruction fetches to start at a non-consecutive location. Control instructions include instructions like branch, jump, etc.

Some prior art machines can execute instructions out of their sequential trace order if no program dependencies are violated. These machines fetch instructions sequentially in the sequential trace order or fetch groups of instruction simultaneously in the sequential trace order. However, these machine do not fetch these instructions out of their sequential trace order. For example, if instruction A precedes instruction B in the sequential trace order, prior art machines can sequentially fetch instruction A then B or simultaneously fetch instruction A with B but do not fetch instruction B before A. Such a restriction is characteristic of machines with a single program counter. Therefore, machines with such constraints are said to be single thread or uni-thread machines. They are unable to fetch instructions later in the sequential trace order before fetching prior instructions in the sequential trace order.

All of the current generation of commercial microprocessors known to the inventors have a single thread of control flow. Such processors are limited in their ability to exploit control and data independence of various portions of a given program. Some of the important limitations are listed below:

Single thread implies that the machine is limited to fetching a single sequence of instructions and is unable to pursue multiple flows (threads) of program control simultaneously.

Single-thread control further implies that data independence can only be exploited if the data-independent instructions are close enough (e.g., in a simultaneous fetch of multiple instructions into the instruction buffer) in the thread to be fetched close together in time and examined together to detect data independence.

The limitation above in turn implies reliance on compiler to group together control independent and data-independent instructions.

Some prior art microprocessors contain some form of control instruction (branch) prediction, called control-flow speculation. Here an instruction following a control instruction in the sequential trace order may be fetched and executed in the hope that the control instruction outcome has been correctly guessed. Speculation on control flow is already acknowledged as a necessary technique for exploiting higher levels of parallelism. However, due to the lack of any knowledge of control dependence, single-thread dynamic speculation can only extend the ability to look ahead until there is a control flow mis-speculation (bad guess). A bad-guess can cause a waste of many execution cycles. It should be noted that run-time learning of control dependence via single thread control flow speculation is at best limited in scope, even if the hardware cost of control-dependence analysis is ignored. Scope here refers to the number of instructions that can be simultaneously examined for the inter-instruction control and data dependencies. Typically, one can afford a much larger scope at compile time than at run time.

Compile-time speculation on control flow, which can have much larger scope than run-time speculation, can also benefit from control-dependence analysis. However, the run-time limitation of a single thread again requires the compiler to group together these speculative instructions along with the non-speculative ones, so that the parallelism is exploitable at run time.

The use of compile-time control flow speculation to expose more parallelism at run time has been mentioned above. Compilers of current machines are limited in their ability to encode this speculation. Commonly used approaches, such as guarding and boosting, rely on the compiler to percolate some instructions to be speculatively executed early in the single thread execution. They also require that the control flow speculation be encoded in the speculative instruction. This approach has the following important limitations:

It is typically very difficult to find enough unused bits in every instruction to encode even shallow control flow speculations. Note that due to backward compatibility constraints (ability to run old binaries,without any translation), instruction encoding cannot be arbitrarily rearranged (implying new architecture) to include the encoding of control flow speculation.

The percolation techniques mentioned above often require extra code and/or code copying to handle mis-speculation. This results in code expansion.

Sequential handling of exceptions raised by the speculative instructions and precise handling of interrupts are often architecturally required. However, implementing these in the context of such out-of-order speculative execution is often quite difficult, due to the upward speculative code motion used by the percolation techniques mentioned above. Special mechanisms are needed to distinguish the percolated instructions and to track their original location. Note that from the point of view of external interrupts, under the constraints of precise handling of interrupts, any instruction execution out of the sequential trace order, may be viewed as speculative. However, in a restricted but more widely used sense, an execution is considered speculative if an instruction processing is begun before establishing that the instruction more precisely, the specific dynamic instance of the instruction) is part of the sequential trace order, or if operands of an instruction are provided before establishing the validity of the operands.

Ignorance of control dependence can be especially costly to performance in nested loops. For example, consider a nested loop, where outer iterations are control and data independent of data dependent inner loop iterations. If knowledge of control and data independence of outer loop iterations is not exploited, their fetch and execution must be delayed, due to the serial control flow speculation involving the inner loops. Furthermore, due to this lack of knowledge of control dependence, speculatively executed instructions from an outer loop may unnecessarily be discarded on the misprediction of one of the control and data independent inner loop iterations. Also, note that the probability of misprediction on the inner loop control flow speculation can be quite high in cases where the inner loop control flow is data dependent and hence quite unpredictable. One such example is given below.

```
/* check the environment list */
for (fp = xlenv; fp; fp = cdr (fp) )
    for (ep = car (fp); ep; ep = cdr (ep) )
        if (sym == car (car (ep) ) )
            cdr (car (ep) ) = new_p;
```

This is a doubly nested loop, where the inner loop traverses a linked list and its iterations are both control and data dependent on previous iterations. However each activation of the inner loop (i.e., the outer loop iterations) is independent of the previous one. [This is a slightly modified version of one of the most frequently executed loops (Xlgetvalue) in one of the SPECint92 benchmarks (Li).]

As explained above, machines with single control flow have to rely on the compiler to group together speculative and/or non-speculative data-independent instructions. However, to group together all data and control independent instructions efficiently, the compiler needs enough architected registers for proper encoding. Therefore, register pressure is increased and beyond a point such code motion becomes fruitless due to the overhead of additional spill code.

Some research attempts have been made to build processors with multiple threads, primarily aimed at implementing massively parallel architectures. The overhead of managing multiple threads can potentially outweigh the performance gains of additional concurrency of execution. Some of the overheads associated with thread management are the following:

Maintaining and communicating the partial order due to data and control dependence, through explicit or implicit synchronization primitives.

Communicating the values created by one thread for use by another thread.

Trade-offs associated with static, i.e., compile-time, thread scheduling versus dynamic, i.e., run-time, thread scheduling. Static thread scheduling simplifies run-time hardware, but is less flexible and exposes the thread resources of a machine implementation to the compiler, and hence requires recompilation for different implementations. On the other hand, dynamic thread scheduling is adaptable to different implementations, all sharing the same executable,but it requires additional run-time hardware support.

Before discussing further details, the following set of working definitions is very useful.

THREAD

A sequence of instructions executable using a single instruction sequencing control (implying, but not necessarily requiring single program counter) and a shared set of architecturally visible machine state.

SEQUENTIAL TRACE ORDER

The dynamic order of execution sequence of program instructions, resulting from the complete execution of the program on a single-control-thread, non-speculative machine that executes instructions one-at-a-time.

MAIN VS. FUTURE THREADS

Among the set of threads at any given time,the thread executing the instruction earliest in the sequential trace order, is referred to as the main thread. The remaining threads are referred to as future threads.

SUMMARY OF THE INVENTION

In a method and system for processing instruction threads, execution is initiated by a processing system of a first set of instructions including a particular instruction. The particular instruction includes an indication of a second set of instructions. In response to execution of the particular instruction and to the processing system being of a first type, the processing system continues executing the first set while initiating execution of the second set. In response to execution of the particular instruction and to the processing system being of a second type, the processing system continues executing the first set without initiating execution of the second set.

It is a technical advantage of the present invention that consistency is achieved with fundamental concepts of a previously existing instruction set architecture ("ISA").

It is another technical advantage of the present invention that forward and backward compatability are achieved between ISAs.

BRIEF DESCRIPTION OF THE DRAWINGS

An illustrative embodiment of the present inventions and their advantages are better understood by referring to the following descriptions and accompanying drawings, in which:

FIG. 4a is a block diagram showing a preferred embodiment of the encoding of the format structure of the FORK instruction;

FIG. 4b is a block diagram showing a preferred embodiment of the encoding of the format structure of the UNCOND_SUSPEND instruction;

DETAILED DESCRIPTION

An illustrative embodiment of the present inventions and their advantages are better understood by referring to FIGS. 1–10 of the drawings, like alphanumeric characters being used for like and corresponding parts of the accompanying drawings.

An object of this invention is an improved method and apparatus for simultaneously fetching and executing different instructions threads.

An object of this invention is an improved method and apparatus for simultaneously fetching and executing different instruction threads with one or more control and data dependencies.

An object of this invention is an improved method and apparatus for simultaneously fetching and speculatively executing different instruction threads with one or more control and data dependencies.

An object of this invention is an improved method and apparatus for simultaneously fetching and speculatively executing different instruction threads with one or more control and data dependencies on different implementations of the computer architecture.

The present invention is an enhancement to a central processing unit (CPU) in a computer that permits speculative parallel execution of more than one instruction thread. The invention discloses novel Fork-Suspend instructions that are added to the instruction set of the CPU, and are inserted in a program prior to run-time to delineate potential future threads for parallel execution. Preferably, this is done by a compiler.

The CPU has an instruction cache with one or more instruction cache ports and a bank of one or more program counters that can independently address the instructions in the instruction cache. When a program counter addresses an instruction, the addressed instruction is ported to an instruction cache port. The CPU also has one or more dispatchers. A dispatcher receives the instructions ported to an instruction cache port in an instruction buffer associated with the dispatcher. The dispatcher also analyzes the dependencies among the instructions in its buffer. A thread management unit in the CPU handles any inter-thread communication and discards any future threads that violate program dependencies. A CPU scheduler receives instructions from all the dispatchers in the CPU and schedules parallel execution of the instructions on one or more functional units in the CPU. Typically, one program counter will track the execution of the instructions in the main program thread and the remaining program counters will track the parallel execution of the future threads. The porting of instructions and their execution on the functional units can be done speculatively.

This invention proposes Fork-Suspend instructions to enhance a traditional single-thread, speculative superscalar CPU to simultaneously fetch, decode, speculate, and execute instructions from multiple program locations, thus pursuing multiple threads of control.

Figure 1A:
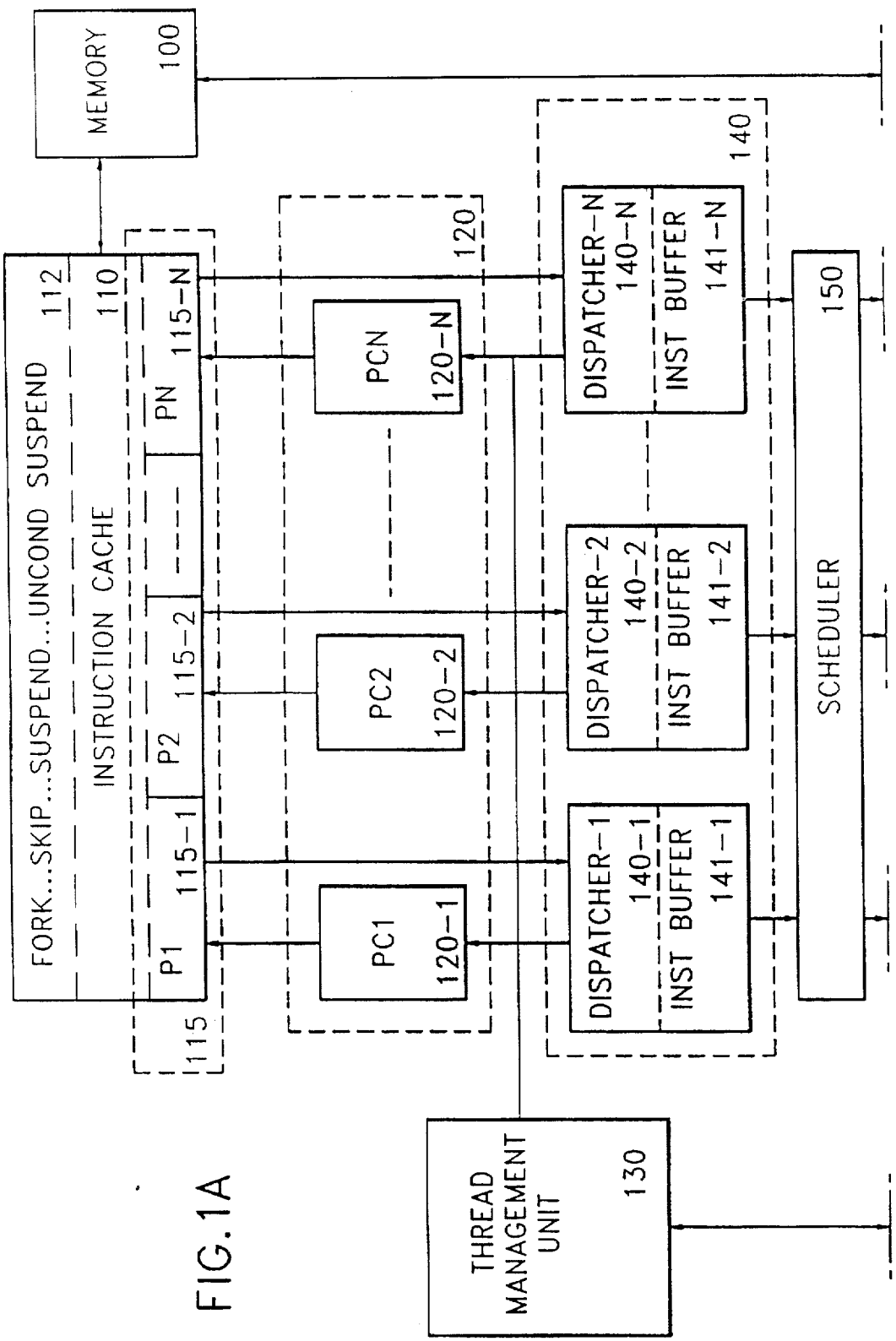
FIGS. 1A and 1B represent a block diagram of the hardware of a typical processor organization that would execute the present method.
Figure 1B:
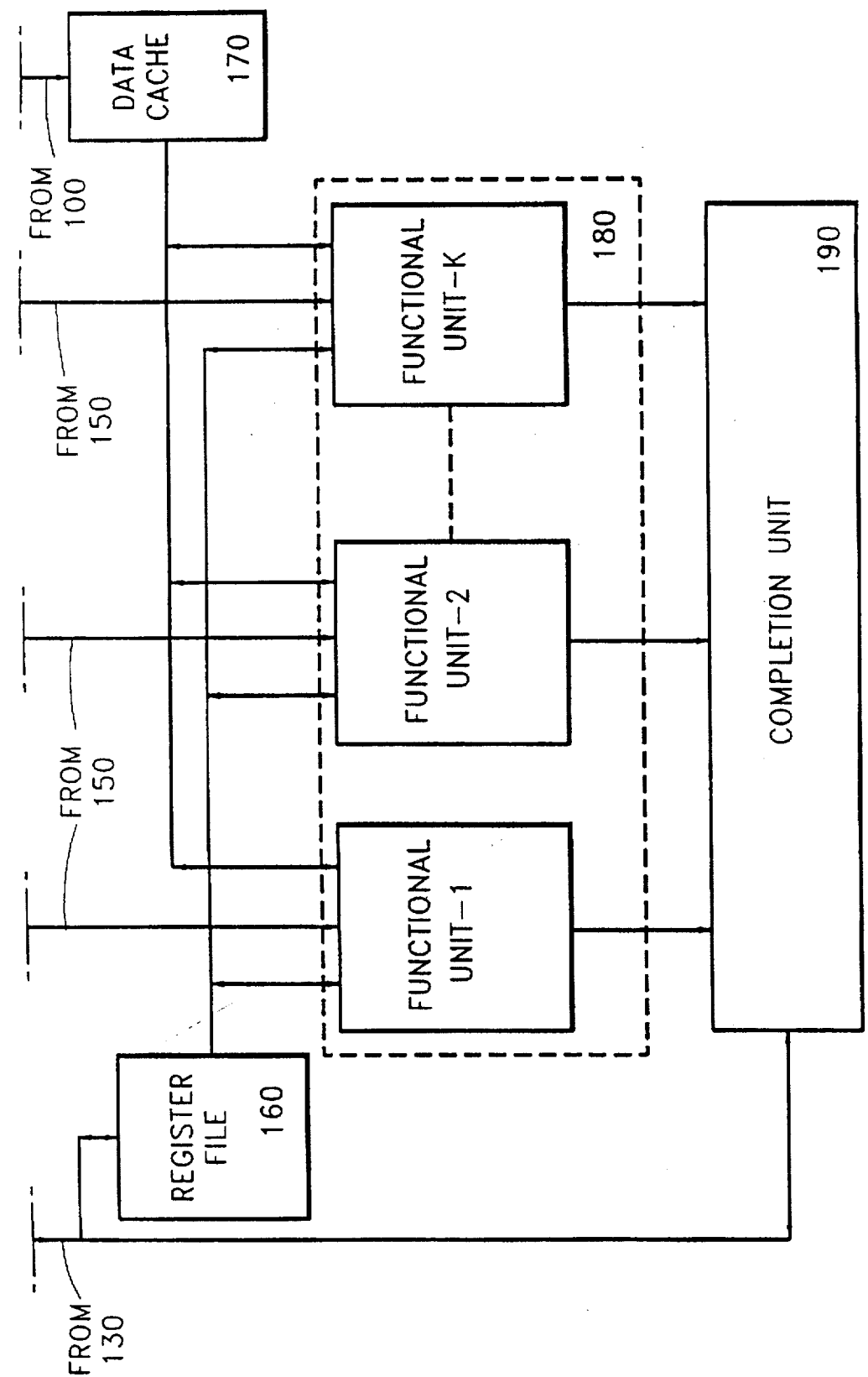

FIG. 1 is a block diagram of the hardware of a typical processor organization that would execute the method of execution proposed in this invention. The method of execution is described later. The detailed description of FIG. 1 follows.

Block 100 is a memory unit of the central processing unit (CPU) of the processor which holds program data and instructions intended for execution on the processor. This memory unit is interfaced with the cache units, such that the frequently used instruction and data portions of the memory unit are typically kept in an instruction cache unit (Block 110) and a data cache unit (Block 170), respectively. Alternatively, the instruction and data caches can be merged into a single unified cache. Access time for the cache unit is typically much smaller than that of the memory unit. Memory and cache units such as these are well known in the art. For example, the cache unit can be replaced by using main memory and its ports for the cache memory and its ports. Cache can also be comprised of multiple caches or caches with one or more levels, as is well known.

Block 110 is an instruction cache unit of the processor (CPU) which holds program instructions which are intended for execution on the processor. These include the new instructions proposed in this invention, such as, FORK, SKIP, SUSPEND, UNCOND_SUSPEND (Block 112). The detailed semantics of these and other new instructions are described later.

Block 115 containing the multiple ports P1, P2, ..., PN (BLOCKS 115-1, 115-2, ..., 115-N), of the instruction cache is new to the current art. The multiple ports enable simultaneous porting of instructions to the instruction threads being executed in parallel. Alternatively, one could port multiple instructions to a certain thread using a single wide port and while that thread is busy executing the ported instructions, the same port could be used for porting multiple instructions to another thread.

Block 120 is a bank of program counters, PC1, PC2, . . . , PCN (Blocks 120-1,120-2, . . . 120-N). These counters can be any counter that is well known in the art. Each program counter tracks the execution of a certain thread. All of the commercial CPUs designed to this date have only had to control the execution of a single instruction thread, for a given program. Hence, the current and previous art has been limited to single program counter, and the bank of multiple program counters is thus a novel aspect of this invention. Each program counter is capable of addressing one or more consecutive instructions in the instruction cache. In the preferred embodiment depicted in the block diagram of FIG. 1, each program counter is associated with an instruction cache port. Alternatively, different program counters can share an instruction cache port.

Furthermore, in our preferred embodiment, a specific program counter is associated with the main thread, and the remaining program counters track the execution of the future threads. In FIG. 1, PC1 (Block 120-1), is the main thread program counter. The remaining program counters are referred to as the future thread program counters (Block 120-2, . . . 120-N).

Block 130 refers to a novel thread management (TM) unit, which is responsible for executing the new instructions which can fork a new thread, and handling inter-thread communication via the merge process (described later).

This unit is also capable of discarding some or all instructions of one or more future threads. This unit is further capable of determining whether one or more instructions executed by any of the future threads need to be discarded due to violations of program dependencies, as a consequence of one or more speculations. If a speculation is made at run time, it is communicated to the TM unit by the speculating unit. For example, any speculation of branch instruction outcome in the dispatcher block (Block 140 described later) needs to be communicated to the TM unit. If any speculation is made at compile time and encoded in an instruction, it is also communicated to the TM unit by the dispatcher in Block 140, that decodes such an instruction. The resulting ability to execute multiple threads speculatively is a unique feature of this invention.

Also note that the parallel fetch and execution of main and future threads implies that the proposed machine can fetch and execute instructions out of their sequential trace order. This unique characteristic of this machine distinguishes it from the prior art machines, which are unable to fetch instructions out of their sequential trace order due to single program counter.

Block 140 refers to a bank of dispatchers, Dispatcher-1, Dispatcher-2 . . . . Dispatcher-N (Blocks 140-1, 140-2, . . . 140-N), where each dispatcher is associated with a specific program counter and thus capable of receiving instructions from one of the instruction cache ports in an instruction buffer associated with the dispatcher (Blocks 141-1,141-2, . . . 141-N). A dispatcher is also capable of decoding and analyzing dependencies among the instructions in its buffer. The dispatcher is further responsible for implementing the semantics of the SKIP, FSKIP, or SKPMG instructions described later.

The instructions encountered by a dispatcher, which can fork or suspend a thread, are forwarded to the thread management unit (Block 130). The TM unit is responsible for activating any future thread dispatcher by loading appropriate starting instruction in the corresponding program counter. The TM unit also suspends a future thread dispatcher on encountering an UNCOND_SUSPEND instruction.

The implementation techniques of run-time dependence analysis for out-of-order execution are well known in prior art. The dispatcher associated with the main program counter, and hence with the main thread, is referred to as the main thread dispatcher. In FIG. 1, Dispatcher-1 (Block 140-1) is the main thread dispatcher. The remaining dispatchers (Blocks 140-2, . . . 140-N), are associated with the future program counters and future threads, and are referred to as the future thread dispatchers.

A novel aspect of the bank of dispatchers proposed in this invention is that the run-time dependence analysis of the instructions in one dispatcher's buffer can be carried out independent of (and hence in parallel) with that of any other dispatcher. This is made possible by the compile-time dependence analysis which can guarantee the independence of the instruction threads under specified conditions. Thus, on the one hand, the run-time dependence analysis benefits from the potentially much larger scope of the compile-time analysis (large scope refers to the ability of examining large number of instructions simultaneously for their mutual dependence). On the other hand, the compile-time analysis benefits from the fork-suspend mechanism, which allows explicit identification of independent threads with speculation on run-time outcomes. The dependence analysis techniques for run-time or compile-time are well known in the prior art, however, the explicit speculative communication of the compile-time dependence analysis to the run-time dependence analysis hardware, is the novelty of this invention.

Block 150 is a scheduler that receives instructions from all the dispatchers in the bank of dispatchers (Block 140), and schedules each instruction for execution on one of the functional units (Block 180). All the instructions received in the same cycle from one or more dispatchers are assumed independent of each other. Such a scheduler is also well known in prior art for superscalar machines. In an alternative embodiment, the scheduler could also be split into a set of schedulers, each controlling a defined subset of the functional units (Block 180).

Block 160 is a register file which contains a set of registers. This set is further broken down into architecturally visible set of registers and architecturally invisible registers. Architecturally visible, or architected registers refer to the fixed set of registers that are accessible to the assembly level programmer (or the compiler) of the machine. The architecturally visible subset of the register file would typically be common to all the threads (main and future threads). Architecturally invisible registers include various physical registers of the CPU, a subset of which are mapped to the architected registers, i.e., contain the values associated with the architected registers. The register file provides operands to the functional units for executing many of the instructions and also receives results of execution. Such a register file is well known in prior art.

As part of its implementation of the merge process (described later), the TM unit (Block 130) also communicates with the register file, to ensure that every architected register is associated with the proper non-architected physical register after the merge.

Block 170 is a data cache unit of the processor which holds some of the data values used as source operands by the instructions and some of the data values generated by the executed instructions. Since multiple memory-resident data values may be simultaneously required by the multiple functional units and multiple memory-bound results may be simultaneously generated, the data cache would typically be multi-ported. Multi-ported data caches are well known in prior art.

Block 180 is a bank of functional units (Functional Unit-1, Functional Unit-2, Functional Unit-K), where each unit is capable of executing some or all types of instructions. The functional units receive input source operands from and write the output results to the register file (Block 160) or the data cache (Block 170). In the preferred embodiment illustrated in FIG. 1, all the functional units are identical and hence capable of executing any instruction. Alternatively, the multiple functional units in the bank may be asymmetric, where a specific unit is capable of executing only certain subset of instructions. The scheduler (Block 150) needs to be aware of this asymmetry and schedule the instructions appropriately. Such trade-offs are common in prior art also.

Block 190 is an instruction completion unit which is responsible for completing instruction execution in an order considered a valid order by the architecture. Even though a CPU may execute instructions out-of-order, it may or may not be allowed to complete them in the same order, depending on the architectural constraints. Instructions scheduled for execution by future thread dispatchers become candidate for completion by the completion unit only after the TM unit (Block 130) ascertains the validity of the future thread in case of a speculative thread.

This invention proposes several new instructions which can be inserted in the instruction sequence at compile time. The details of the semantics of these instructions follow.

1. FORK

This instruction identifies the beginning address(es) of one or more threads of instructions. Each identified thread of instruction is referred to as a future thread. These future threads can be executed concurrently with the forking thread which continues to execute the sequence of instructions sequentially following the FORK. The starting CPU state for the future thread is a copy of the CPU state at the point of encountering the FORK instruction.

2. UNCOND_SUSPEND

On encountering this instruction, a future thread must unconditionally suspend itself, and await its merger with the forking thread. This may be needed for example, in cases where the instructions following the unconditional suspend instruction have essential data dependency with some instructions on a different thread. Since this proposed instruction does not require any other attribute, it could also be merged with the SUSPEND instruction (described later). In other words,one of the encodings of SUSPEND instruction could simply specify an unconditional suspend.

3. SUSPEND

On encountering this instruction, a future thread can continue to proceed with its instruction fetch and execution, but the results of the sequence of instructions between a first SUSPEND instruction and a second SUSPEND instruction or an UNCOND_SUSPEND instruction in the sequential trace order of the program, are discarded, if the compile-time specified condition associated with the first SUSPEND instruction evaluates to false at run time.

To simplify the discussions to follow, we define the term dependence region of a SUSPEND instruction as the sequence of instructions in the sequential trace order that starts with the first instruction after the SUSPEND instruction and is terminated on encountering any other SUSPEND instruction or on encountering an UNCOND_SUSPEND instruction.

4. SKIP

Upon encountering this instruction, a future thread may just decode the next compile-time specified number of instructions (typically spill loads), and assume execution of these instructions by marking the corresponding source and destination registers as valid, but the thread need not actually perform the operations associated with the instructions. The main thread treats this instruction as a NOP.

5. FORK_SUSPEND

The op-code of this instruction is associated with an address identifying the start of a future thread, and a sequence of numbers (N1, N2, ... Nn), each with or without conditions. The given sequence of n numbers refers to the n consecutive groups of instructions starting at the address associated with the FORK instruction. A number without any associated condition, implies that the corresponding group of instructions can be unconditionally executed as a future thread. A number with an associated condition implies that the future thread execution of the corresponding group of instructions would be valid only if the compile-time specified condition evaluates to true at run time.

6. FORK_S_SUSPEND

The op-code of this instruction is associated with an address identifying the start of a future thread, a number s, and a sequence of numbers (N1, N2, ... , Nn), each with or without conditions. The given sequence of n numbers refers to the n consecutive groups of instructions starting at the address associated with the FORK instruction. A number without any associated conditions implies that the corresponding group of instructions can be unconditionally executed as a future thread. A number with an associated condition implies that the future thread execution of the corresponding group of instructions would be valid only if the compile-time specified condition evaluates to true at run time. The associated number s refers to the s instructions, at the start of the thread, which may just be decoded to mark the corresponding source and destination registers as valid, but the thread need not actually perform the operations associated with the instructions.

7. FORK_M_SUSPEND

The op-code of this instruction is associated with an address identifying the start of a future thread, a set of masks (M1, M2, ... , Mn), each with or without conditions. A mask without any associated condition, represents the set of architected registers which unconditionally hold valid source operands for the future thread execution. A mask associated with a condition, refers to the set of architected registers which can be assumed to hold valid source operands for the future thread execution, only if the compile-time specified condition evaluates to true at run time.

8. FSKIP

The op-code of this instruction is associated with a mask, and a number s. Upon encountering this instruction, a future thread may skip the fetch, decode, and execution, of the next s instructions. The future thread further uses the mask to mark the defined set of architected registers as holding valid operands. The main thread treats this instruction as a NOP.

9. SKPMG

Upon encountering this instruction, a future thread may just decode the next compile-time specified number of instructions (typically spill loads), to mark the corresponding source and destination registers as valid, but the thread need not actually perform the operations associated with the instructions. If this instruction is encountered by the main thread, a check is made to determine if a future thread was previously forked to the start at the address of this SKPMG instruction. If so, the main thread is merged with the corresponding future thread by properly merging the machine states of the two threads and the main thread resumes the execution at the instruction following the instruction where the future thread was suspended. If there was no previous fork to this address, the main thread continues to execute the sequence of instructions following this instruction. The importance of such an instruction is explained later.

DETAILED DESCRIPTION OF FORMATS OF THE NEW INSTRUCTIONS

A detailed description of FIGS. 3a through 3i, illustrating the formats of the new instructions follows.

1. FORK <addr_1>, <addr_2>, ..., <addr_n>

Figure 3A:
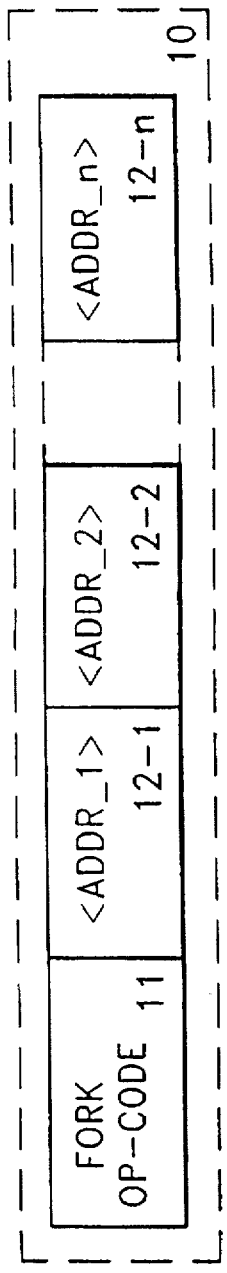
FIG. 3a is a block diagram showing the format structure of a FORK instruction.

The FORK instruction (Block 10) in FIG. 3a, includes an op-code field (Block 11), and one or more address fields, addr_1, addr_2, ..., addr_n (Blocks 12-1, 12-2, ... ,12-N), each identifying the starting instruction addresses of a future thread.

2. UNCOND_SUSPEND

Figure 3B:
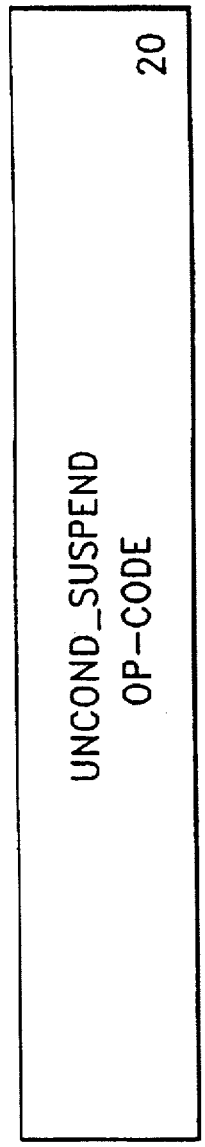
FIG. 3b is a block diagram showing the format structure of an UNCOND_SUSPEND instruction.

The UNCOND_SUSPEND instruction (Block 20) in FIG. 3b, contains an op-code field.

3. SUSPEND <mode>, <cond_1> <cond_2>...<cond_n>

Figure 3C:
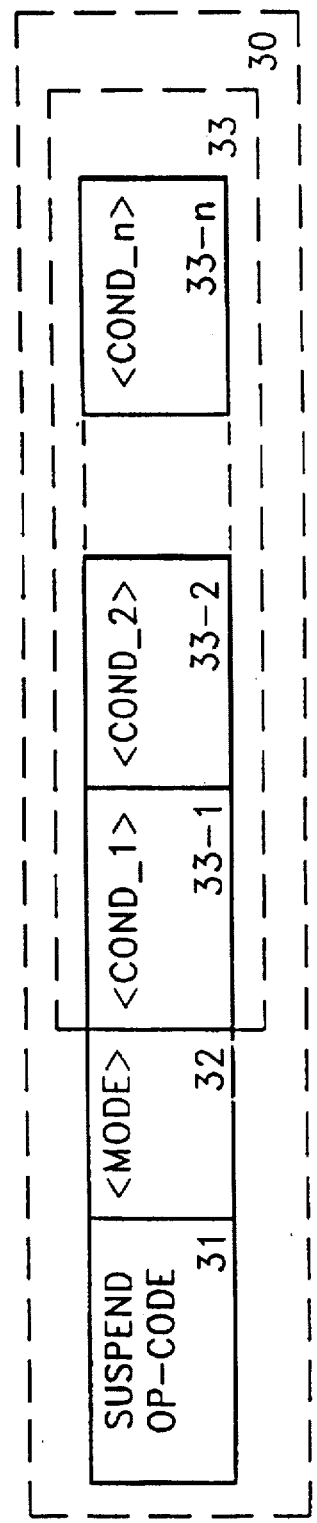
FIG. 3c is a block diagram showing the format structure of a SUSPEND instruction.

The SUSPEND instruction (Block 30) in FIG. 3c, includes SUSPEND op-code field (Block 31), a mode field (Block 32), and a condition field Block 33). A preferred embodiment of the invention can use the condition field to encode compile-time speculation on the outcome of a sequence of one or more branches as, cond_1, cond_2, ... , cond_n (Blocks 33-1, 33-2, ..., 33-n). The semantics of this specific condition-field encoding is explained in more detail below.

The mode field is used for interpreting the set of conditions in the condition field in one of two ways. If the mode field is set to valid (V), the thread management unit discards the results of the set of instructions in the dependence region associated with the SUSPEND instruction, if any one of the compile-time specified conditions, among <cond_1> through <cond_n>, associated with the SUSPEND instruction,evaluates to false at run time. If the mode field is set to invalid (I), the thread management unit discards the results of the set of instructions in the dependence region associated with the SUSPEND instruction, if all of the compile-time specified conditions, from <cond_1> through <cond_n>, associated with the SUSPEND instruction, evaluate to true at run time. Intuitively speaking, a compiler would use the valid mode setting for encoding a good path from the fork point to the merge point, whereas, it would use the invalid mode setting for encoding a bad path from the fork point to the merge point.

The first condition in the sequence, cond_1, is associated with the first unique conditional branch encountered by the forking thread at run time, after forking the future thread containing the SUSPEND instruction; the second condition in the sequence, cond_2, is associated with the second unique conditional branch encountered by the forking thread at run time, after forking the future thread containing the SUSPEND instruction, and so on. Only the branches residing at different instruction locations are considered unique. Furthermore, the conditions which encode the compile-time speculation of a specific branch outcome, in a preferred embodiment, can be either one of the following three: taken (T), not-taken (N), or, don't care (X). Alternately, the speculation associated with the conditions can be restricted to be either of the following two: taken (T), or, not-taken (N).

To further clarify the condition encoding format, consider some example encodings:

SUSPEND V, T X N

This encoding implies that the instructions following this conditional suspend instruction are valid only if the speculation holds. In other words, results of the set of instructions in the dependence region associated with the SUSPEND instruction, if all of the compile-time specified conditions, from <cond_1> through <cond_n>, associated with the SUSPEND instruction evaluate to true at run time. The first control flow condition assumes that the first unique conditional branch encountered by the forking thread at run time, after forking the thread containing the SUSPEND instruction, is taken. The second such branch is allowed by the compiler to go either way (in other words a control independent branch), and the third such branch is assumed by the compiler to be not taken.

SUSPEND I, N T X N T X T

This encoding implies that the instructions following this conditional suspend instruction are invalid only if the speculation holds. In other words, results of the set of instructions in the dependence region associated with the SUSPEND instruction, are discarded only if all of the compile-time specified conditions, from <cond_1> through <cond_n>, associated with the SUSPEND instruction evaluate to true at run time. The first control flow condition assumes that the first unique conditional branch encountered by the forking thread at run time, after forking the thread containing the SUSPEND instruction, is not taken. The second such branch is assumed by the compiler to be taken, the third such branch is allowed by the compiler to go either way (in other words a control independent branch), the fourth such branch is assumed by the compiler to be not taken, the fifth such branch is assumed by to be taken, the sixth such branch is allowed to go either way, and, the seventh such branch is assumed to be taken.

Note that if the forking thread code in the region after the fork and before the merge, is restricted to be loop-free, the dynamic sequence of branches encountered in the forking thread after the fork, would be all unique. In other words, under these circumstances, the first unique conditional branch would simply be the first dynamically encountered conditional branch, the second unique conditional branch would simply be the second dynamically encountered conditional branch, and so on.

The condition format explained above is also used in specifying compile-time speculation conditions in case of FORK_SUSPEND, FORK_S_SUSPEND, and FORK_M_SUSPEND instructions. The preferred embodiment assumes a valid mode field setting in the condition field encodings used in FORK_SUSPEND, FORK_S_SUSPEND, and FORK_M_SUSPEND instructions, implying that the thread management unit discards the results of the set of instructions in the dependence region associated with the SUSPEND instruction, if any one of the compile-time specified conditions, among <cond_1> through <cond_n>, associated with the SUSPEND instruction evaluates to false at run time.

4. FORK_SUSPEND <addr>, <N1, cond_1> ... <Nn, cond_n>

Figure 3D:
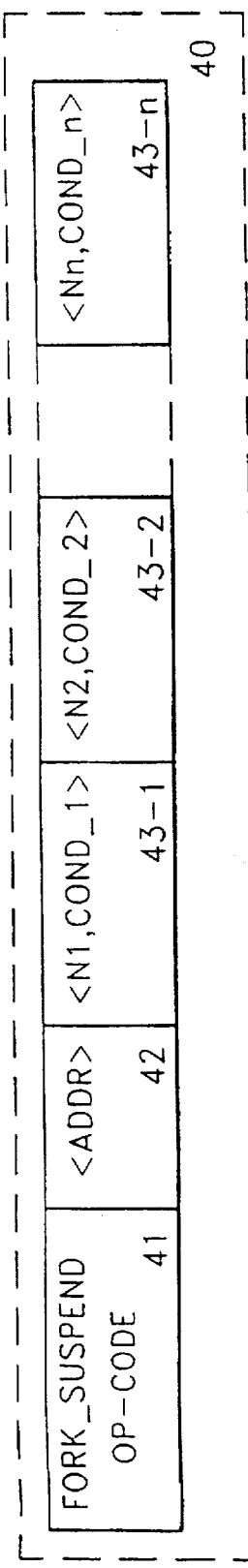
FIG. 3d is a block diagram showing the format structure of a FORK_SUSPEND instruction.

The FORK_SUSPEND instruction (Block 40) in FIG. 3d, includes an op-code field (Block 41), an address field (Block 42), and one or more condition fields (Blocks 43-1, 43-2, ..., 43-n), each associated with a count field, and one or more conditions. The preferred format for the conditions is same as that explained above in the context of SUSPEND instruction, assuming valid mode field.

5. SKIP <n>

Figure 3E:
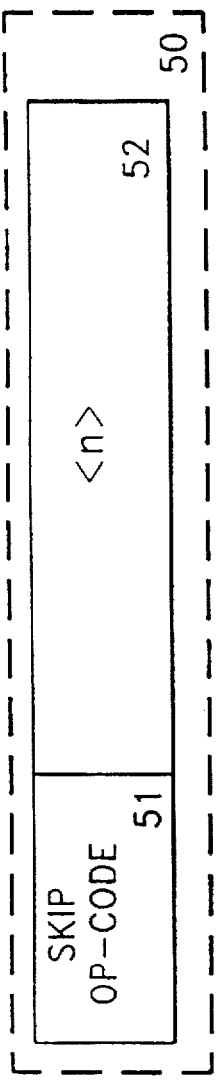
FIG. 3e is a block diagram showing the format structure of a SKIP instruction.

The SKIP instruction (Block 50) in FIG. 3e, includes an op-code field (Block 51), a count field (Block 52), specifying the number of instructions after this instruction whose execution can be skipped, as explained above in the context of SKIP instruction.

6. FORK_S_SUSPEND <addr>, <n>, <N1.cond_1> ... <Nn.cond_n>

Figure 3F:
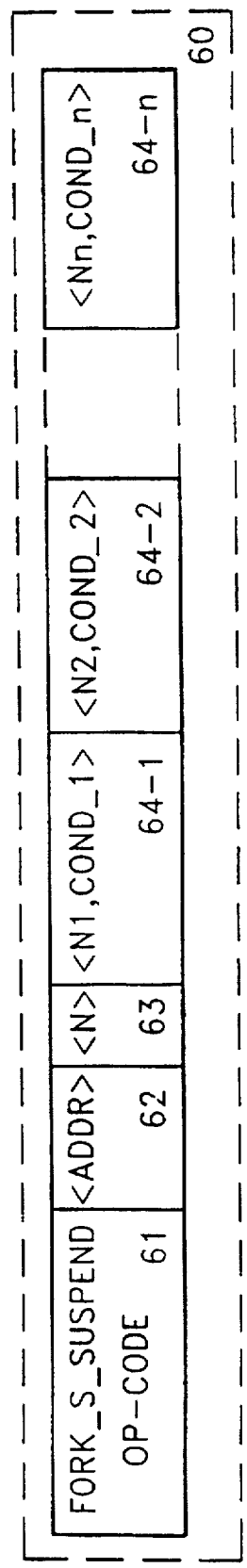
FIG. 3f is a block diagram showing the format structure of a FORK_S_SUSPEND instruction.

The FORK_S_SUSPEND instruction (Block 60) in FIG. 3f, includes an op-code field (Block 61), an address field (Block 62), a count field (Block 63) specifying the number of instructions, at the start of the thread, which can be skipped in the sense explained above (in the context of SKIP instruction) and one or more condition fields (Block 64-1, 64-2, ..., 64-n), each associated with a count field, and one or more conditions. The preferred format for the conditions is same as that explained above in the context of SUSPEND instruction, assuming valid mode field.

7. FORK_M_SUSPEND <addr>, <M1.cond_1>...<Mn, cond_n>

Figure 3G:
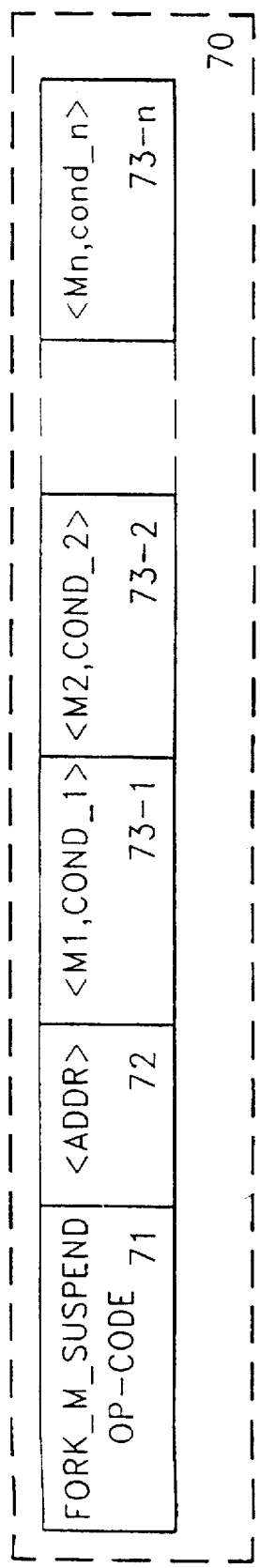
FIG. 3g is a block diagram showing the format structure of a FORK_M_SUSPEND instruction.

The FORK_M_SUSPEND instruction (Block 70) in FIG. 3g, includes an op-code field (Block 71), an address field (Block 72), and one or more condition fields, (Blocks 73-1, 73-2, ..., 73-n), each associated with a mask field, and one or more conditions. Each mask field contains a register mask specifying the set of architected registers that hold valid source operands, provided the associated conditions hold at run time. The preferred format for the conditions is same as that explained above in the context of SUSPEND instruction, assuming valid mode field.

8. FSKIP <mask> <n>

Figure 3H:
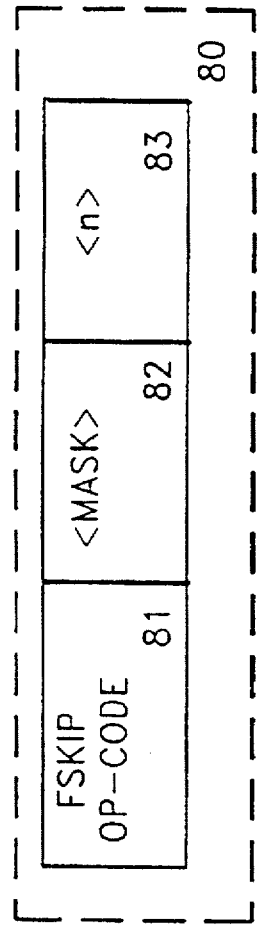
FIG. 3h is a block diagram showing the format structure of an FSKIP instruction.

The FSKIP instruction (Block 80) in FIG. 3h, includes an op-code field (Block 81), and a mask field (Block 82) defining a set of registers, and a count field (Block 83), specifying the number of instructions that can be completely skipped, as explained above in the context of FSKIP instruction.

9. SKPMG <n>

Figure 3I:
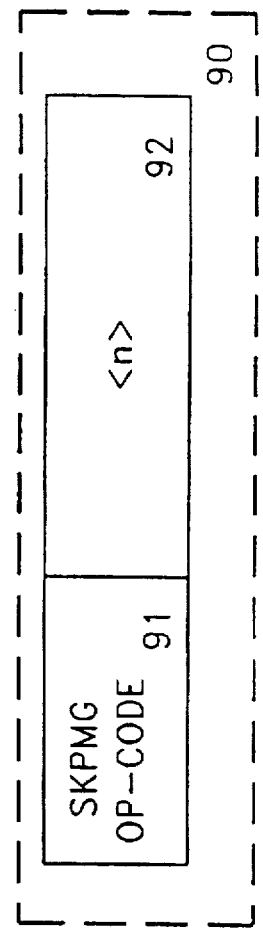
FIG. 3i is a block diagram showing the format structure of an SKPMG instruction.

The SKPMG instruction (Block 90) in FIG. 3i, includes an op-code field (Block 91), a count field (Block 92), specifying the number of instructions after this instruction whose execution can be skipped, as explained above in the context of SKPMG instruction.

The merge action: merging of the forked thread with a forking thread:

The forked (future) thread is merged with the corresponding forking thread (e.g., the main thread) when the forking thread reaches the start of the forked future thread. Merging is accomplished by merging the CPU states of the two threads such that the CPU states defined by the forked thread supersede, while the rest of the states are retained from the forking thread. CPU state of a thread would typically include the architecturally visible registers used and defined by the thread. The forking thread program counter is updated to continue execution such that the instructions properly executed by the merged forked thread are not re-executed and any instruction not executed by the merged forked thread is appropriately executed; Properly executed instructions refer to those instructions that do not violate any essential program dependencies. The forking thread continues the execution past the latest execution point of the merged thread, and, the instructions properly executed by the merged future thread become candidates for completion, at the end of the merge process. The resources associated with the merged future thread are released at the end of the merge process. Note that at the time of merge, the forked future thread is either already suspended, or still actively executing. In either case, at the end of the merge process, the merged future thread effectively ceases to exist. Also note that in the absence of an explicit suspend primitive, such as,
UNCOND_SUSPEND, a forked future thread would always continue to execute until the merge.

Optional Nature of Forks:

A novel characteristic of the instructions proposed in this invention is that their use at compile time does not require any assumption regarding the run-time CPU resources. Depending on the aggressiveness of an actual implementation, a specific CPU may or may not be able to actually fork a future thread. In other words, from the CPU's point of view, an actual fork at run time in response to encountering any FORK instruction, is entirely optional. The user of these instructions (e.g., the compiler) does not need to keep track of the number of pending future threads, and it also cannot assume any specific fork to be definitely obeyed (i.e., fork a future thread) at run time. The compiler identifies control and data independent code regions which may be executed as separate (future) threads. However, the compiler does not perform any further restructuring or optimizations which assume that these threads will execute in parallel. For example, the cpmpiler preserves any spill code that would be needed to guarantee correct program execution when any one of the inserted FORK instructions is ignored by the CPU at run time. Spill code refers to the set of instructions which are inserted at compile time, to store the contents of any architecturally visible CPU register in a certain location in the instruction cache, and later reloading the contents of the same location without another intervening store. Note that the execution of spill code may be redundant during its execution as a future thread. To optimize the handling of such spill code during future thread execution, the invention adds the SKIP instruction and its variants, such as, FSKIP and SKPMG, which enable compile-time hint for reducing or eliminating the redundant spill code execution. The detailed semantics of this new instruction is described above.

Note that as a direct consequence of the optional nature of FORK instructions, there is no need for re-compilation for different implementations of this enhanced machine architecture, each capable of forking zero or more threads. Similarly, there is no need to recompile any old binary, which does not contain any of the new instructions.

Interpreting Multiple Conditional Suspends in a Future Thread:

It is possible that a future thread which gets forked in response to a FORK instruction, encounters a series of conditional suspends before encountering an unconditional suspend. Each conditional suspend is still interpreted in association with the common fork point and independent of other conditional suspends. Thus, it is possible to associate different control flow speculations with different portions of a future thread. Consider a SUSPEND instruction A. Suppose A is followed by another SUSPEND instruction B, after a few instructions other than FORK, SUSPEND, UNCOND_SUSPEND, FORK_S_SUSPEND, FORK_M_SUSPEND, or SKPMG instructions. SUSPEND instruction B would typically be followed later by an UNCOND_SUSPEND instruction. Assume that the compile-time condition associated with the SUSPEND instruction A is determined to be false at run time. To simplify the compilation and to reduce the state keeping in future threads, a preferred embodiment of this invention can simply discard the results of all instructions between A and the UNCOND_SUSPEND instruction, instead of limiting the discarding to between A and B.

Simplified identification of merge-points:

It may be possible at compile time to group all the spill loads in the future thread and move the group to the top of the block, where future thread execution will begin. If the compiler further ensures that the first instruction of every potential future thread is the new SKPMG instruction, then this instruction serves both as an indicator of the spill loads that can be skipped, and as a marker for the start of the future thread. The semantics of this instruction has been described above. Note that in the absence of such a future thread marker (in the form of SKPMG), the main thread may constantly need to check its instruction address against all previously forked future threads to detect if a merge is needed. Also note that even if the number of instructions being skipped is zero, the compiler must still insert this SKPMG instruction, as it serves the additional functionally of a future thread marker in this interpretation.

Figure 2A:
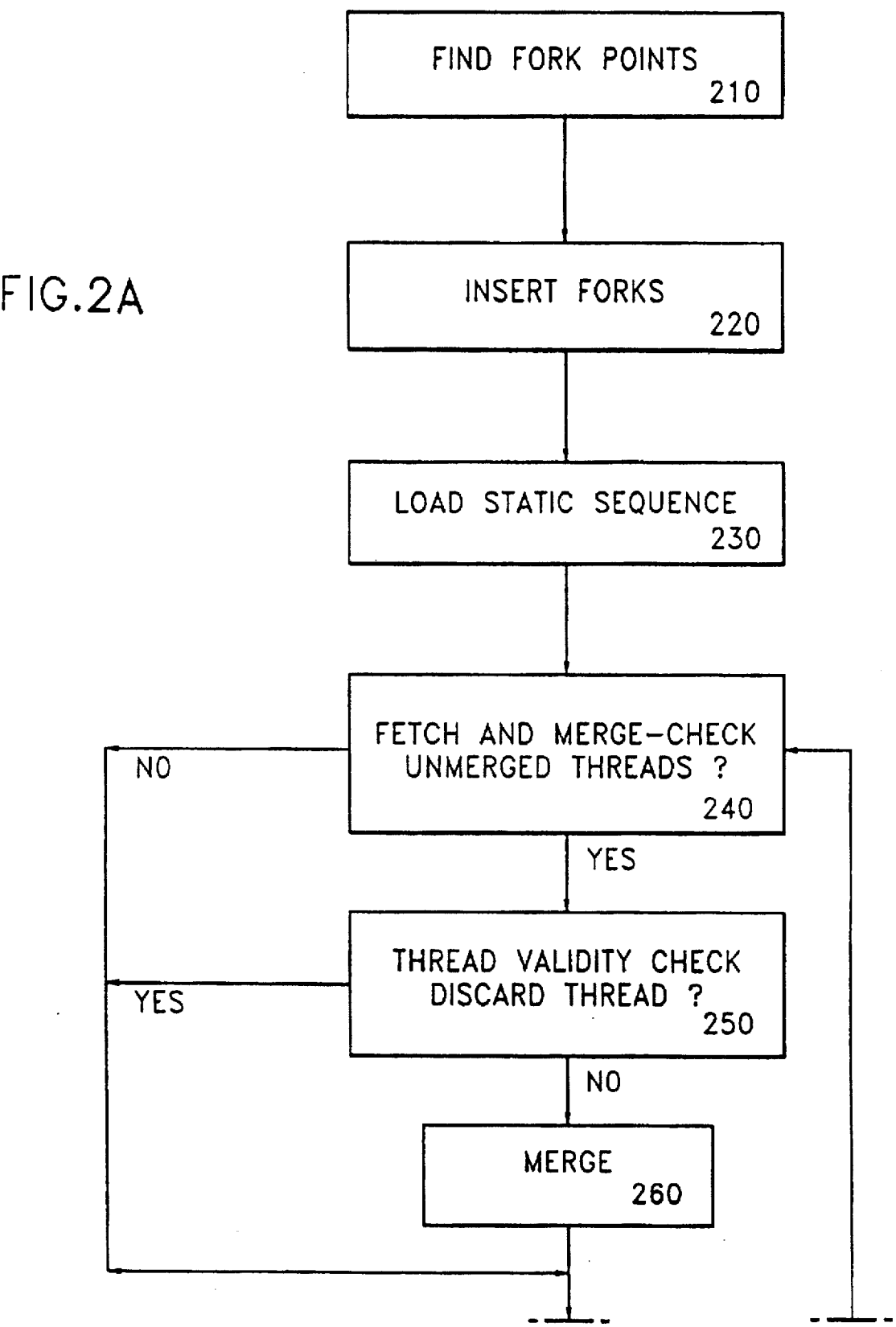
FIG. 2A and 2B represent a flow chart showing the steps of the present method.
Figure 2B:
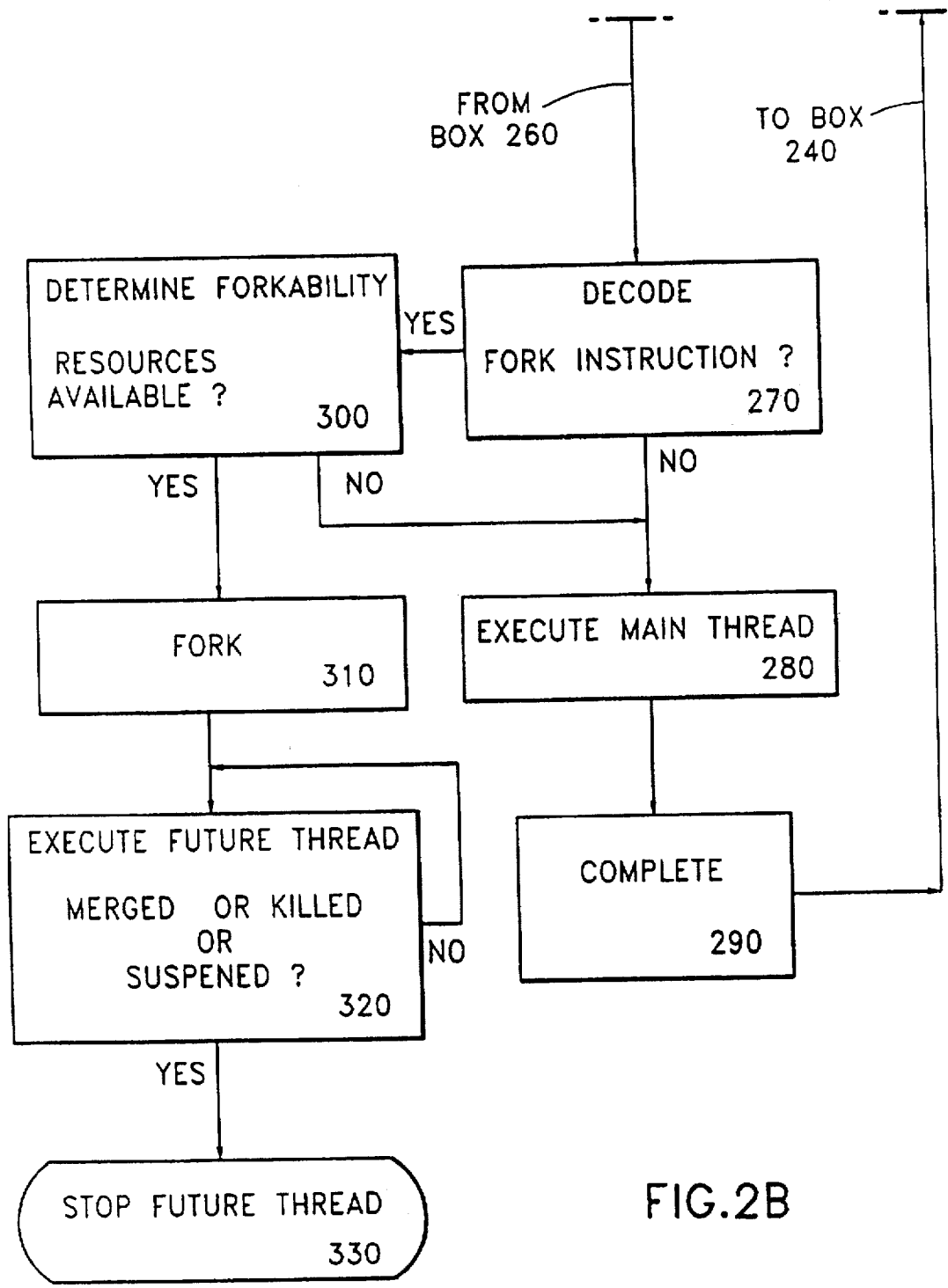

FIG. 2 is a flow chart showing the steps of the present method of execution, referred to as the Primary Execution Methodology (PEM). A detailed description of FIG. 2, along with a description of the present method, follows.

1. Find fork points (Block 210)

Generate a static sequence of instructions using techniques known in the art, without any regard to the new instructions proposed in this invention. Analyze this sequence of instructions to determine a set of fork points. A fork point refers to the position in the static instruction sequence where the available machine state is capable of starting a parallel execution of one or more sets of instructions which appear later (but not immediately after the fork point) in the sequential trace order. The identification of fork points involves data and control dependence analysis, based on some or all of the corresponding program dependence graph (combination of control dependence graph and data dependence graph), using techniques known in the prior art. For example, the resolution of a branch instruction can lead to a fork point for the threads of instructions that are essentially control dependent on the branch instruction.

2. Insert FORKs (Block 220)

Insert zero or more FORK instructions at zero or more of the potential fork points, at compile time, where, the FORK instruction is capable of identifying the starting addresses of zero or more potential future threads, associated with the fork point. The association of a specific FORK instruction with its forked future thread(s), if any, is managed by the TM unit described above.

3. Load static sequence (Block 230)

Load the static sequence of instructions generated after the previous (Insert FORKs) step (Block 220) into the memory system (Block 100 of FIG. 1) starting at a fixed location, where the memory system is interfaced to the instruction cache of the central processing apparatus, and subsequences of the static sequence are periodically transferred to the instruction cache.

4. Fetch and merge-check (Block 240)

Fetch the instruction sequence from the instruction cache by addressing the sequence through the main program counter (i.e., as a main thread) starting at a current address, and updating the program counter. Instructions missing in the instruction cache are fetched from the main memory into the cache. Along with the instruction fetch, a check is also made to determine if there is one or more unmerged future threads starting at the current instruction fetch address. The TM unit (Block 130 of FIG. 1) is also responsible for this carrying out this implicit merge-check. This check would normally involve comparing each instruction fetch address against the starting addresses of all unmerged (pending) future threads.

5. Thread validity check (Block 250)

In case it is determined in the previous step (Block 240) that one or more future threads had been forked previously at the instruction fetch address of another execution thread (e.g., the main thread), a further check is made by the TM unit to ascertain if some or all of the instructions executed by each of these future threads need to be discarded due to any violation of program dependencies, resulting from one or more speculations.

6. Merge (Block 260)

Validly executed portions of the forked future threads identified in the previous (Thread validity check) step (Block 250), are merged with the main thread via the merge operation described before.

7. Decode (Block 270)

Decode the fetched instructions in the dispatcher. Check to see if one or more of the instructions are decoded as a FORK instruction.

8. Execute main thread (Block 280)

For any instruction decoded as other than FORK instructions in the previous (Decode) step (Block 270), continue execution by analyzing the instruction dependencies (using Block 140 of FIG. 1), and by scheduling them for execution (using Block 150 of FIG. 1) on appropriate functional units (Block 180 of FIG. 1).

9. Complete (Block 290)

Complete instruction execution through the completion unit (Block 190 of FIG. 1), as described above. The process of fetch, decode, and execute, described in steps 4 through 9, continues.

10. Determine fork-ability (Block 300)

If an instruction is decoded as a FORK instruction in the (Decode) step associated with Block 270 above, a check is made to determine the availability of machine resources for forking an additional future thread. Machine resources needed to fork a future thread include an available program counter, available internal buffer space for saving thread state.

11. Fork (Block 310)

In case there are resources available, the TM unit forks future thread(s) by loading the address(es) associated with the FORK instruction into future program counter(s). This starts off future thread(s) execution, where, the starting machine state (except the program counter) of a future thread is same as that of the main thread (the thread decoding the associated FORK instruction) at the fork point.

12. Executive future thread (Block 320)

A future thread execution proceeds, in parallel with the forking thread execution, in a manner similar to steps (4) through (8) above, except using one of the future program counters and one of the future thread dispatchers, instead of the main program counter and the main thread dispatcher, respectively, and referring to the main thread as the forking thread instead.

13. Stop future thread (Block 330)

A future thread execution is suspended and the associated resources are released, after the future thread is merged with the forking thread or after the future thread is discarded by the TM unit.

Some enhancements to the primary execution methodology (PEM) described above, are described below.

Alternative Embodiment 1

1. Step (2) in the PEM has the following additional substep:

An UNCOND_SUSPEND instruction is inserted at the end of every future thread.

2. Step (12) in the PEM the following additional substep:

Upon encountering an UNCOND_SUSPEND instruction, during its corresponding future thread execution, a future thread unconditionally suspends itself.

3. Step (8) in the PEM the following additional substep:
If an UNCOND_SUSPEND instruction is encountered for execution by a thread other than its corresponding future thread (e.g., in the main thread), it is ignored.

Alternative Embodiment 2
1. Step (1) in the PEM with alternative embodiment 1, has the following additional substep:
Corresponding to every UNCOND_SUSPEND instruction, zero or more SUSPEND instructions may be inserted in the corresponding future thread, where, each SUSPEND instruction is associated with a condition.
2. Step (2) in the PEM with alternative embodiment 1, has the following additional substep:
The set of instructions in the dependence region associated with a SUSPEND instruction are considered valid for execution in the corresponding future thread only if the compile-time specified condition associated with the SUSPEND instruction evaluates to true at run time. Therefore, a future thread can also be forced to suspend (by the TM unit) at a conditional suspend point, if the associated speculation is known to be invalid by the time the future thread execution encounters the conditional suspend instruction.
3. Step (3) in the PEM with alternative embodiment 1, has the following additional substep:
If a SUSPEND instruction is encountered for execution by a thread other than its corresponding future thread (e.g., in the main thread), it is ignored.

Alternative Embodiment 3:
1. Step (1) in the PEM with alternative embodiment 2, has the following additional substep:
Zero or more SKIP instruction may be inserted in a future thread, where, each SKIP instruction is associated with a number, s.
2. Step (2) in the PEM with alternative embodiment 2, has the following additional substep:
Upon encountering a SKIP instruction, with an associated number, s, during its corresponding future thread execution, the next s instructions following this instruction, may only need to be decoded, and the remaining execution of these instructions can be skipped. The source and destination registers used in these instructions can be marked as holding valid operands, but, these s instructions need not be scheduled for execution on any of the functional units.
3. Step (3) in the PEM with alternative embodiment 2, has the following additional substep:
If a SKIP instruction is encountered for execution by a thread other than its corresponding future thread (e.g., in the main thread), it is ignored.

Alternative Embodiment 4
1. Step (1) in the PEM with alternative embodiment 2, has the following additional substep:
Zero or more FSKIP instruction may be inserted in a future thread, where, each FSKIP instruction is associated with a mask, defining a set of architected registers, and a number, s.
2. Step (2) in the PEM with alternative embodiment 2, has the following additional substep:
Upon encountering an FSKIP instruction, with an mask, and a number, s, during its corresponding future thread execution, the next s instructions following this instruction can be skipped. In other words these instructions need not be fetched, decoded or executed. The registers identified in the mask can be marked as holding valid operands.
3. Step (3) in the PEM with alternative embodiment 2, has the following additional substep:
If an FSKIP is encountered for execution by a thread other than its corresponding future thread (e.g., in the main thread), it is ignored;

Alternative Embodiment 5
1. Step (1) in the PEM with alternative embodiment 2, has the following additional substep:
A SKPMG instruction is inserted at the start of every future thread, where, each SKPMG instruction is associated with a a number, s.
2. Step (2) in the PEM with alternative embodiment 2, has the following additional substep:
Upon encountering a SKPMG instruction, with an associated number, s, during its corresponding future thread execution, the next s instructions following this instruction, may only need to be decoded, and the remaining execution of these instructions can be skipped. The source and destination registers used in these instructions can be marked as holding valid operands, but, these s instructions need not be scheduled for execution on any of the functional units.
3. Step (3) in the PEM with alternative embodiment 2, has the following additional substep:
If a SKPMG is encountered for execution by a thread other than its corresponding future thread (e.g., in the main thread), a merge-check is made to determine if a future thread has been forked in the past starting at the instruction address of the SKPMG instruction.
4. The implicit merge-check in Step (4) of the PEM is now unnecessary and hence dropped.

Altnerative Embodiment 6
1. The Insert FORKs step (i.e., Step-3) in the PEM is replaced by the following step:
Insert zero or more FORK_SUSPEND instructions at zero or more of the potential fork points, where, the FORK_SUSPEND instruction contains an address identifying the starting address of an associated potential future thread, and a sequence of numbers each with and without a condition, where, the given sequence of numbers refers to the consecutive groups of instructions, starting at the address associated with the FORK_SUSPEND instruction. The association of a specific FORK_SUSPEND instruction with its forkrd future thread, if any, is managed by the TM unit described above.
2. The Determine fork-ability step (i.e., Step-10) in the PEM is replaced by the following step:
For an instruction decoded as a FORK_SUSPEND instruction, checking to determine the availability of machine resources for forking an additional future thread.
3. The Fork step (i.e., Step-11) in the PEM is replaced by the following step:
Forking a future thread, if there are resources available, by loading the address(es) associated with the FORK_SUSPEND instruction into future program counter(s).
4. The Execute future thread step (i.e., Step-12) in the PEM has the following additional substep:
The number sequence associated with the FORK_SUSPEND instruction controls the execution of the corresponding future thread in the following manner. A number, say, n without any associated condition, implies that the corresponding group of n instructions can be unconditionally executed as a future thread, and a number, say, m with an associated condition, implies that the future thread execution of the corresponding group of m instructions would be valid only if the compile-time specified condition evaluates to true at run time.

Alternative Embodiment 7

1. The Insert FORKs step (i.e., Step-3) in the PEM is replaced by the following step:

Insert zero or more FORK_S_SUSPEND instructions at zero or more of the potential fork points, where, a FORK_S_SUSPEND instruction contains an address identifying the starting address of an associated potential future thread, a number, say, s, and a sequence of numbers each with and without a condition, where, the given sequence of numbers refers to the consecutive groups of instructions, starting at the address associated with the FORK_S_SUSPEND instructions.

2. The Determine fork-ability step (i.e., Step-10) in the PEM is replaced by the following step:

For an instruction decoded as a FORK_S_SUSPEND instruction, checking to determine the availability of machine resources for forking an additional future thread.

3. The Fork step (i.e., Step-11) in the PEM is replaced by the following step:

Forking a future thread, if there are resources available, by loading the address(es) associated with the FORK_S_SUSPEND instruction into future program counter (s).

4. The Execute future thread step (i.e., Step-12) in the PEM has the following additional substep:

The number sequence associated with the FORK_S_SUSPEND instruction controls the execution of the corresponding future thread in the following manner. During the execution of the corresponding thread as a future thread, the first s instructions may only be decoded, and the source and destination registers used in these instructions may be marked as holding valid operands, but, these s instructions need not be scheduled for execution on any of the functional units. Furthermore, a number, say, n without any associated condition, implies that the corresponding group of n instructions can be unconditionally executed as a future thread, and a number, say, m with an associated condition, implies that the future thread execution of the corresponding group of m instructions would be valid only if the compile-time specified condition evaluates to true at run time.

Alternative Embodiment 8

1. The Insert FORKs step (i.e., Step-3) in the PEM is replaced by the following step:

Insert zero or more FORK_M_SUSPEND instructions at zero or more of the potential fork points, where, a FORK_M_SUSPEND instruction contains an address identifying the starting address of an associated potential future thread, and a set of masks, each with or without an associated condition.

2. The Determine fork-ability step (i.e., Step-10) in the PEM is replaced by the following step:

For an instruction decoded as a FORK_M_SUSPEND instruction, checking to determine the availability of machine resources for forking an additional future thread.

3. The Fork step (i.e., Step-11) in the PEM is replaced by the following step:

Forking a future thread, if there are resources available, by loading the address(es) associated with the FORK_M_SUSPEND instruction into future program counter (s).

4. The Execute future thread step (i.e., Step-12) in the PEM has the following additional substep:

The mask sequence associated with the FORK_M_SUSPEND instruction controls the execution of the corresponding future thread in the following manner. During the execution of the corresponding thread as a future thread, a mask associated with the FORK_M_SUSPEND instruction, without any condition, represents the set of architected registers which unconditionally hold valid source operands for the future thread execution, and a mask associated with a condition, refers to the set of architected registers which can be assumed to hold valid source operands for the future thread execution, only if the compile-time specified condition evaluates to true at run time. The TM unit discards the results of some or all of the instructions in the future thread if the compile-time specified conditions associated with the source register operands of the instructions do not hold true at run time.

Alternative Embodiment 9

1. The Execute main thread step (i.e., Step-8) in the PEM has the following additional substep:

Every branch resolution (i.e., the determination of whether a conditional branch is taken or nots and the associated target address) during a thread execution is communicated to the TM unit. The TM unit uses this information to determine if a future thread forked to the incorrect branch address, and any dependent threads, need to be discarded. This enables simultaneous execution of control dependent blocks of instructions, as illustrated later.

Alternative Embodiment 10

1. The Fetch and merge-check step (i.e., Step-4) in the PEM has the following additional substep:

The merge-check is extended to include a check to see if any of the previously forked threads, has stayed unmerged for longer than a pre-specified time-out period. Any such thread is discarded by the TM unit.

DETAILED DESCRIPTION OF ENCODINGS OF THE NEW INSTRUCTIONS

FIGS. 4a through 4d illustrate the preferred encodings of some of the new instructions. Bit position 0 refers to the most significant bit position, and bit position 31 refers to the least significant bit position.

1. FORK (FIG. 4a)

This instruction (Block 111) uses the primary op-code of 4, using bits 0 through 5. The relative address of the starting address of the future thread is encoded in the 24-bit address field in bit positions 6 through 29. The last two bits, bit positions 30 and 31 are used as extended op-code field to provide encodings for alternate forms of FORK instruction. These two bits are set to 0 for this version of the FORK instruction.

2. UNCOND_SUSPEND (FIG. 4b)

This instruction (Block 222) uses the primary op-code of 19 in bit positions 0 through 5. Bits 21 through 30 of the extended op-code field are set to 514 to distinguish it from other instructions with the same primary op-code. Bit 31 is set to 0 to distinguish this unconditional suspend instruction from the conditional suspend (SUSPEND) instruction.

Figure 4C:
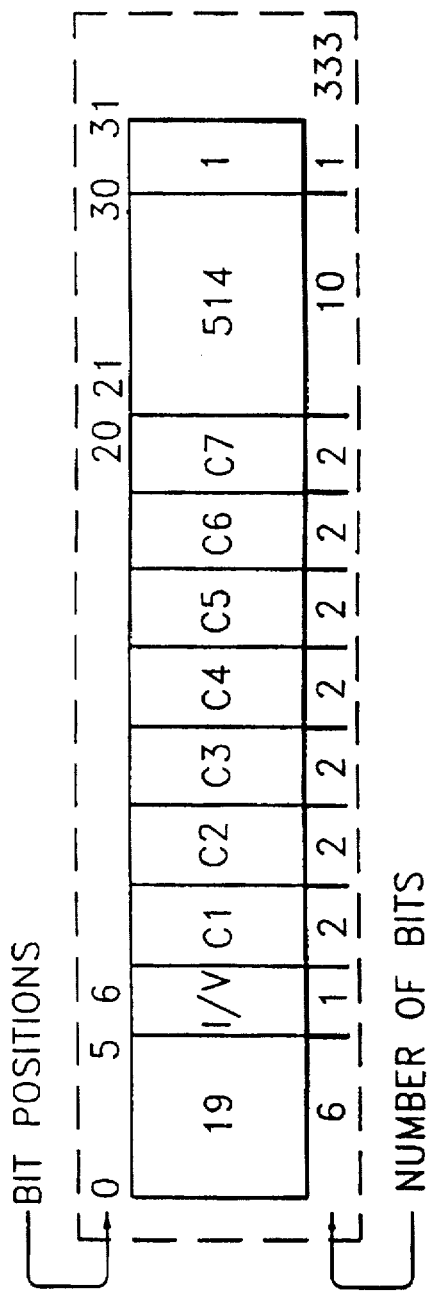
FIG. 4c is a block diagram showing a preferred embodiment of the encoding of the format structure of the SUSPEND instruction.

3. SUSPEND (FIG. 4c)

This instruction (Block 333) uses the primary op-code of 19 in bit positions 0 through 5. Bits 21 through 30 of the extended op-code field are set to 514 to distinguish it from other instructions with the same primary op-code. Bit 31 is set to 1 to distinguish this conditional suspend instruction from the unconditional suspend (UNCOND_SUSPEND) instruction. Compile-time branch speculations are one of the following: taken not-taken, or don't care. Therefore 2 bits are used for each of the seven compile-time branch speculations, C1 through C7, using bit positions 7 through 20. The first condition in the sequence, C1 (bits 7 and 8), is associated with the first unique conditional branch encountered by the forking thread at run time, after forking the future thread containing the SUSPEND instruction, . . . the seventh condition in the sequence, C7, is associated with the seventh unique conditional branch encountered by the forking thread at run time, after forking the future thread containing the SUSPEND instruction. The mode field is encoded in bit position 6. The semantics associated with this encoding has already been explained above in the context of SUSPEND instruction.

Figure 4D:
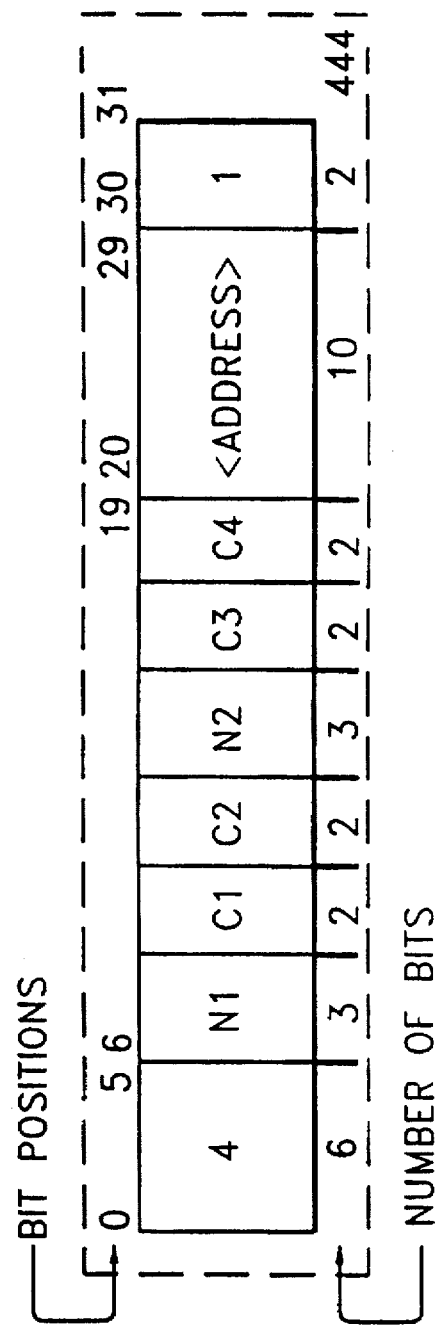
FIG. 4d is a block diagram showing a preferred embodiment of the encoding of the format structure of the FORK_SUSPEND instruction.

4. FORK_SUSPEND (FIG. 4d)

This instruction (Block 444) also uses the same primary op-code of 4 as that used for the FORK instruction above, in bit positions 0 through 5. However, the extended op-code field (bits 30 and 31) is set to 1 to distinguish it from the FORK instruction. The relative address of the starting address of the future thread is encoded in the 10-bit address field in bit positions 20 through 29. Compile-time branch speculations are one of the following: taken not-taken, or don't care. Therefore 2 bits are used for each of the four compile-time branch speculations, C1 through C4. The first condition in the sequence, C1, is associated with the first unique conditional branch encountered by the forking thread at run time, after forking the future thread containing the SUSPEND instruction, . . . the fourth condition in the sequence, C4, is associated with the fourth unique conditional branch encountered by the forking thread at run time, after forking the future thread containing the SUSPEND instruction. The first number, N1 (bits 6 through 8) refers to the number of valid instructions starting at the starting address of the future thread, assuming conditions associated with both C1 (bits 9 and 10) and C2 (bits 11 and 12) are evaluated to hold true at run time. Whereas, N2 (bits 13 through 15) refers to the number of valid instructions starting at the starting address of the future thread +N1 instructions, assuming conditions associated with both C3 (bits 16 and 17) and C4 (bits 18 and 19) are evaluated to hold true at run time.

EXAMPLES

Figure 5A:
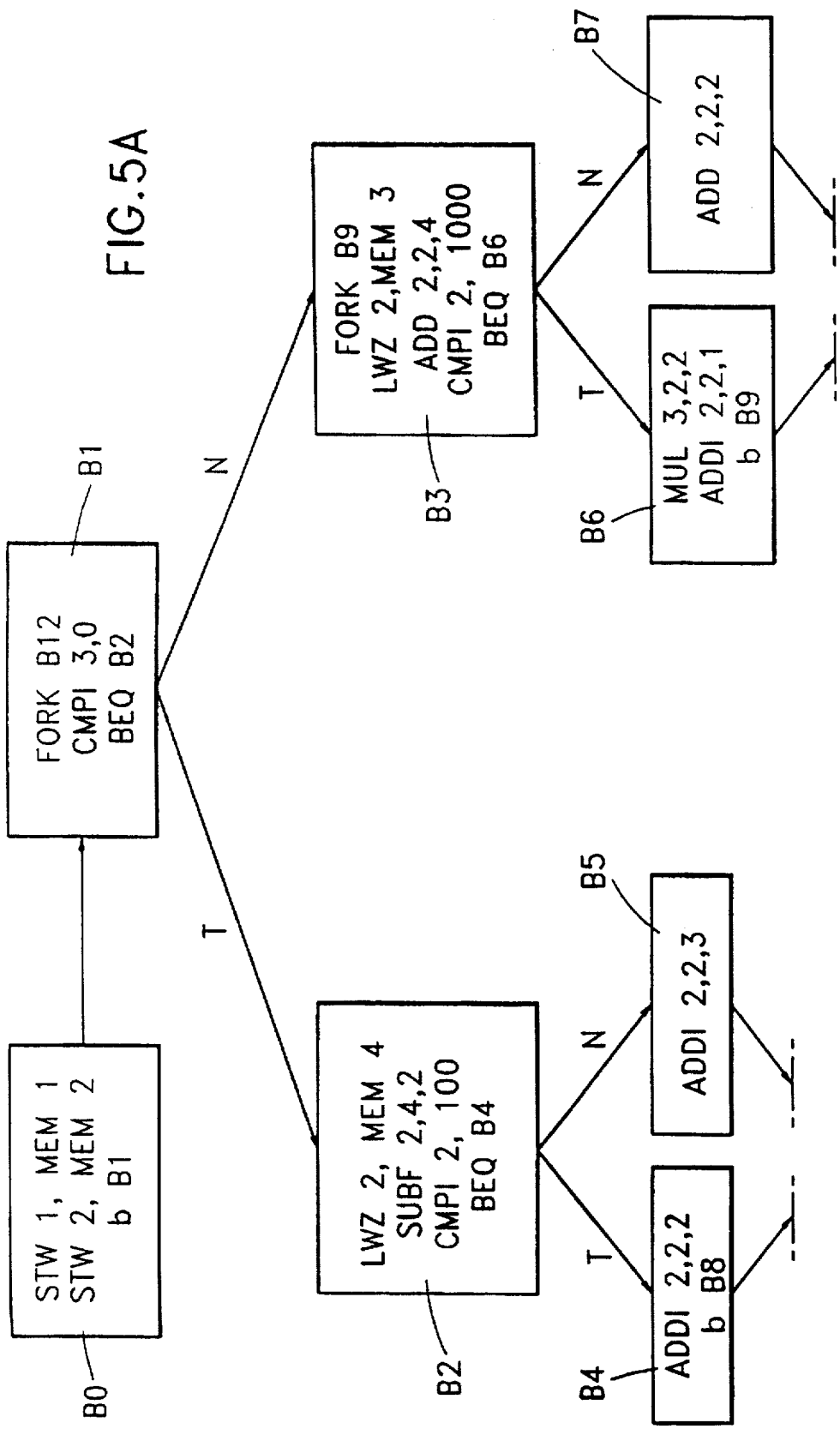
FIG. 5 illustrates the use of some of the instructions proposed in this invention, in samples of assembly code.
Figure 5B:
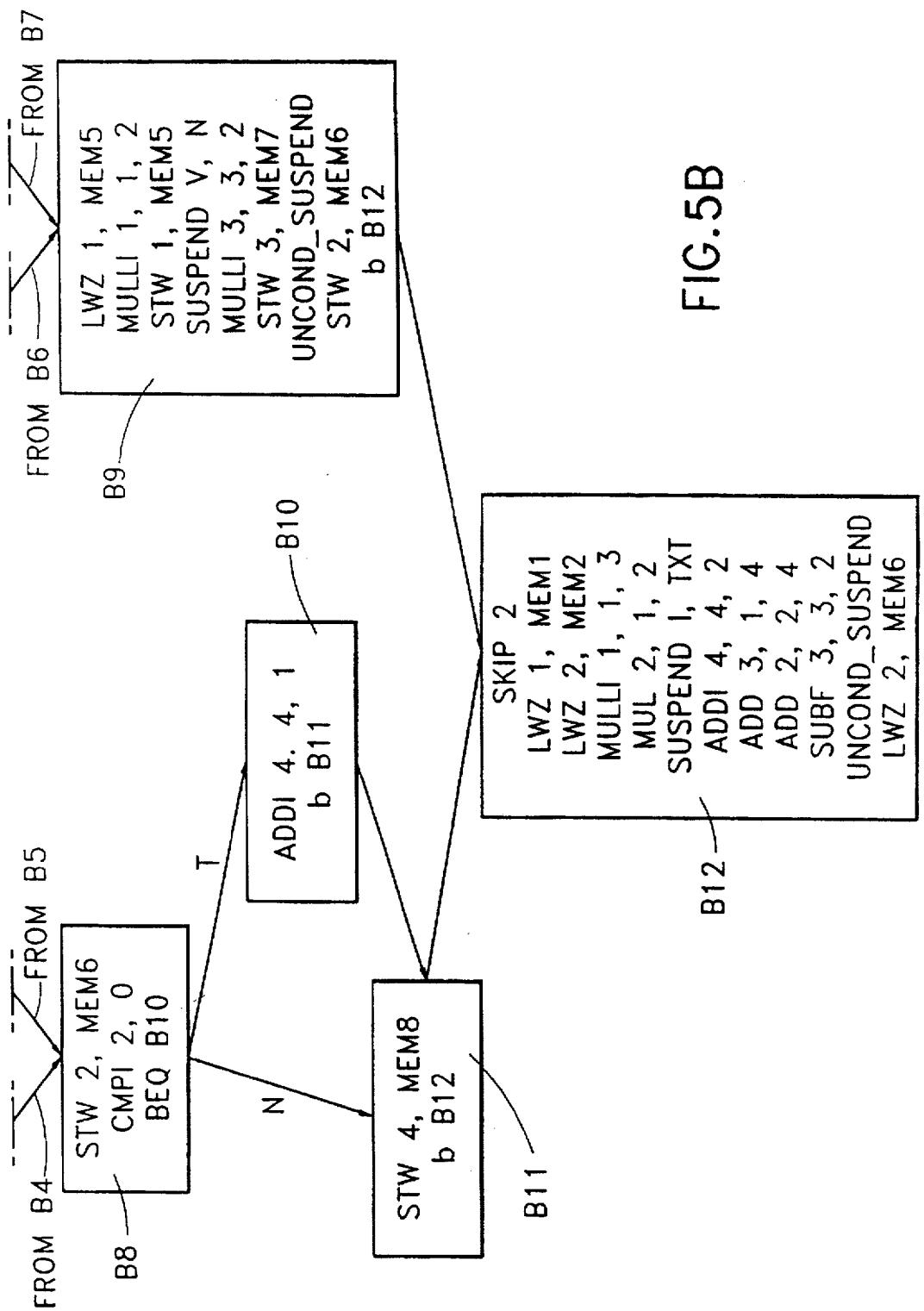
Figure 6:
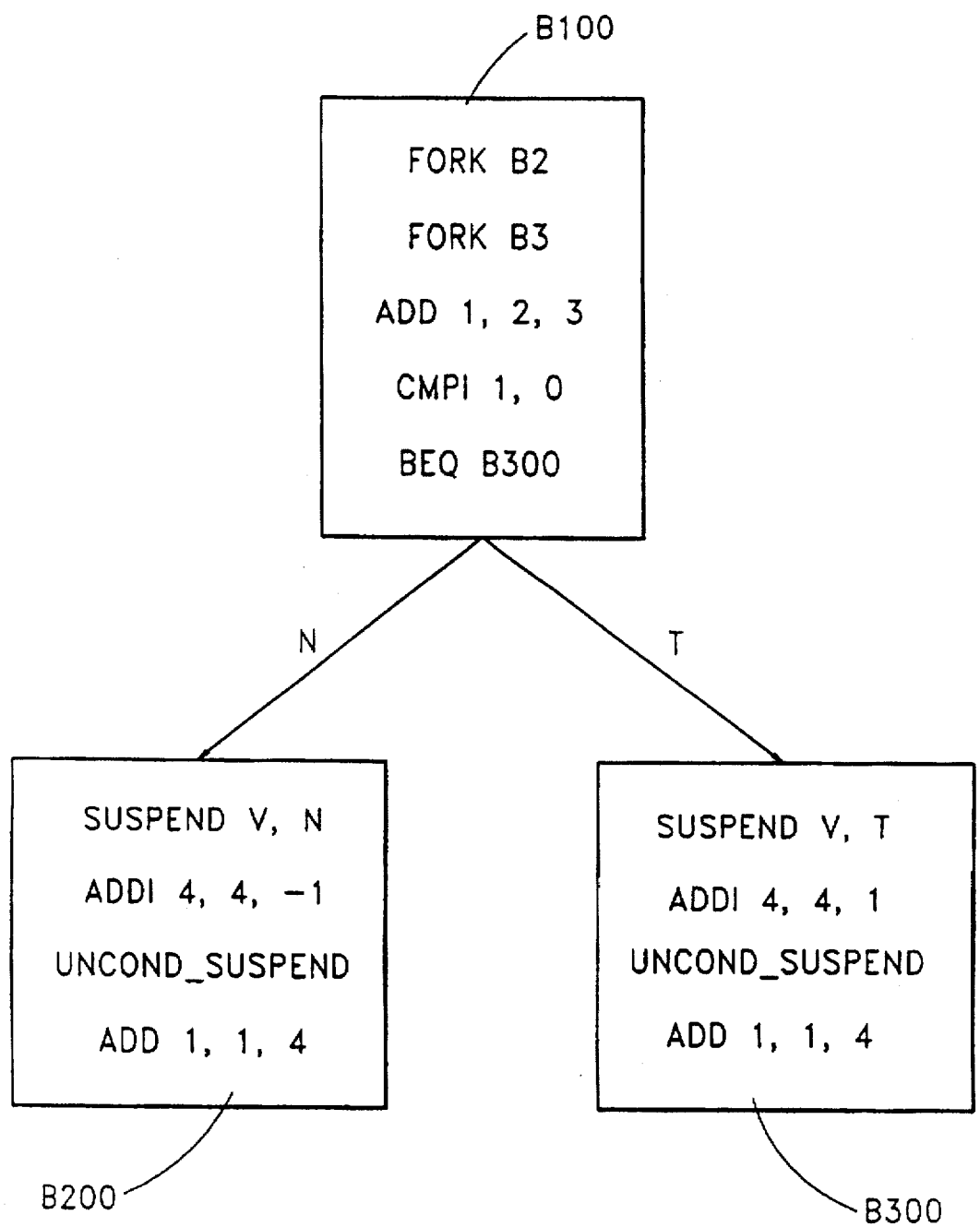
FIG. 6 also illustrates the use of some of the instructions proposed in this invention, in samples of assembly code.

FIGS. 5 and 6 illustrate the use of some of the instructions proposed in this invention, in samples of code sequences. Code sequences shown have been broken into blocks of non-branch instructions, optionally ending with a branch instruction. Instruction mnemonics used ere either those introduced this invention (e.g., FORK), or those of the PowerPC architecture. (PowerPC is a trademark of the International Business Machines, Corp.) Any block of code-sequence that ends with a conditional branch has one edge labelled N to the block to which the control is transferred if the branch is not taken, and another edge labelled T to the block to which the control is transferred if the branch is taken.

FIG. 5 illustrates the use of the instructions proposed in this invention for speculating across control independent blocks of instructions. FORK, SUSPEND, and UNCOND_SUSPEND instructions have been used to enable simultaneous fetch, decode, speculation and execution of different control independent blocks, such as, B1 and B12, in FIG. 5. When the control reaches from block B0 to B1, FORK instruction is used in block B1 to start off parallel execution of control-independent block B12 in parallel with B1. Note that the main thread executing B1 can follow one of several paths but they all lead to block B12, executed as a future thread. Similarly, in case of a resolution of the branch at the end of block B1 to B3, FORK instruction is used for parallel exeuction of control-independent block B9. The thread executing block B3 merges with the future thread started at B9, after executing either block B6 or B7.

Unconditional suspends, or, UNCOND_SUSPEND instructions are used in the future thread executions of blocks B9 and B12 to observe essential dependencies resulting from updates to architected register 2, and memory location mem6 respectively. Conditional suspend, or, SUSPEND instruction is used in block B9 to speculatively execute next two instructions, assuming the forking thread (executing block B3) flows into block B7 at run time and avoids block B6 (which updates register 3), as a result of the branch at the end of block B3. Similarly, assuming the control does not flow into block B10 (which updates register 4), SUSPEND instruction is used to speculatively execute next four instructions. Note that the path to be avoided, namely the path from the fork-point in block B1 to the merge-point in block B12, via blocks B2 and B10, is coded at compile-time using the path expression TXT. This expression implies that the first unique conditional branch after the fork point, i.e., the branch at the end of B1 is taken, the second branch, i.e., the branch at the end of B2 can go either way, and the branch at the end of B8 is also taken. Note that there more more than one good paths (i.e., the paths with no update to register 4) in this case. The branch at the end of block B2 can go either to block B4 or block B5, and either of those paths would be considered good, if the branch at the end of B8 is not taken and falls through to B11.

Note that the spill loads at the beginning of block B12 in FIG. 5, have been preserved by the compiler to guarantee the optional nature of the forks. Also note the use of SKIP instruction in FIG. 5, to optimize away the redundant execution of spill loads, if B12 is executed as a future thread.

FIG. 6 illustrates the use of FORK and SUSPEND instructions for speculating across control dependent blocks of instructions. FORK instructions have been used to fork from block B100 to control dependent blocks B200 and B300. The control dependent block B200 and B300 are executed speculatively, and in parallel. While the main thread executes block B100, forked future threads execute block 200 and block B300. Upon the resolution of the branch at the end of block B100, the TM unit discards the future thread conditioned on the incorrect branch outcome. For example, if the branch is taken, the future thread starting at B200 is discarded.

POTENTIAL ADVANTAGES

This section explains in more detail how the instructions proposed above help solve the problems identified before.

1. Alleviating the instruction-fetch bottleneck

As illustrated in the example above, proposed fork and suspend instructions offer a novel way of addressing the instruction fetch bottleneck of current superscalar processor. The compiler can use these instructions to point to arbitrarily far (dynamically) control independent blocks. Control independence implies that given that the program control has reached the fork point it is bound to reach these future blocks (assuming of course, no interrupt that can alter the flow in an unforeseeable manner). Therefore, an instruction can be fetched as soon as the control dependence of its block is resolved (without waiting for the control flow). Also, speculatively fetched instructions should only be discarded if the branch from which they derive their control dependence (not the one from which control flow is derived) is mispredicted. For example, instructions in block B9 can be fetched along with those of block B3, soon after their shared control dependence on block B1 is either resolved or speculated. Furthermore instructions from block B9 should be considered a wasted fetch or discarded only if the control dependent branch at the end of block B1 is mispredicted and not if the branch at the end of block B3 is mispredicted. A traditional superscalar without any notion of control dependence would discard its speculative fetches of blocks B7 (or B6) as well as B9 if blocks B7 and B9 are fetched via traditional control flow speculation of the branch at the end of block B3 and this turns out to be a misprediction later on.

2. Exploiting data independence across control independent blocks

The instructions in the control independent blocks which are also data independent of all possible control flow paths leading to these blocks, can be executed simultaneously and non-speculatively, via multiple forks to these control independent blocks. For example, the first three instructions in block B9 (which is control independent of B3) are data independent of instructions in block B3, B6 and B7 (the set of basic blocks on the set of control flow paths from B3 to B9). Hence they can be fetched and executed non-speculatively using the proposed fork and suspend instructions.

3. Speculating data dependence across control independent blocks

To increase the overlap between future thread and main thread activities, there has to be some form of speculation on potential data dependence in the future thread. Consider the example in FIG. 5. There is only one definition of register 4 in blocks B1 through B11. It is defined in block B10. Speculating on the main thread control flow, i.e., assuming that the main thread control flow does not reach block B10, it is possible to increase the overlap between the future thread starting at the beginning of block B12 and the main thread continuing through block B1. The exact control flow leading to the offending instruction in block B10 is encoded as <TXT> as part of the proposed conditional suspend instruction. Note that the control flow speculation is being done at compile time and hence based on static branch prediction (and/or profile driven) techniques only. Also note that the net effect here is similar to speculatively boosting the instructions between the conditional and the unconditional suspend instructions. But unlike previously known techniques of guarded (or boosted) instructions, which encode the control flow condition as part of each guarded (or boosted) instruction, the proposed technique encodes the condition for a group of instructions using conditional and unconditional suspend instructions. Some of the important advantages of this approach are the following:

Minor Architectural Impact

As implied above, a primary advantage of the proposed scheme is its relatively minimal architectural impact. Except for the addition of fork and suspend instructions (of which only the fork needs a primary op-code space), the existing instruction encodings are unaffected. Therefore, unlike the boosting approach, the proposed mechanism does not depend on available bits in the op-code of each boosted instruction to encode the control flow speculation.

Precise Encoding of the Speculated Control Flow

Since the control flow speculation is encoded exclusively in a new (suspend) instruction, one can afford to encode it precisely using more bits. For example, a compromise had to be reached in the boosting approach to only encode the depth of the boosted instruction along the assumed flow path (each branch had an assumed outcome bit, indicating the most likely trace path). This compromise was necessary to compactly encode the speculated control flow, so that it could be accommodated in each boosted instruction's op-code. As a result of this compromise, a speculatively executed boosted instruction was unnecessarily discarded on the misprediction of a control independent branch. In the approach proposed here, control independent branches along the speculated control flow path are properly encoded with an X, instead of N or T. Hence, a speculatively executed instruction in the future thread is not discarded on the misprediction of a control independent branch.

Small Code Expansion

The typical percolation and boosting techniques often require code copying or patch-up code in the path off the assumed trace. This can lead to significant expansion of code size. The proposed technique does not have any of these overheads and the only code expansion is due to the fork and suspend instructions, which are shared by a set of instructions.

Simpler Implementation of Sequential Exception Handling

There is no upward code motion in the proposed technique, and the code speculatively executed still resides in its original position only. Therefore, exception handling can be easily delayed until the main thread merges with the future thread containing the exception causing instruction. In other words, exceptions can be handled in proper order, without having to explicitly mark the original location of the speculative instructions which may raise exceptions.

Simpler Implementation of Precise Interrupts

The unique main thread in this proposal, is always precisely aware of the last instruction completed in the sequential program order. Therefore, there is no need of any significant extra hardware for handling interrupts precisely.

4. Decoupling of Compilation and Machine Implementation

Note that due to the optional nature of the forks, as explained before, the compilation for the proposed architecture can be done assuming a machine capable of large number of active threads. And the actual machine implementation has the option of obeying most of these forks, or some of these forks, or none of these forks, depending on available machine resources. Thus compilation can be decoupled to a large extent in this context from the machine implementation. This also implies that there may be no need to recompile separately for machines capable of small or large number of active threads.

5. Parallel Execution of Loop Iterations

Proposed fork and suspend instructions can also be used to efficiently exploit across iteration parallelism in nested loops. For example, consider the sample loop illustrated before from the one of the SPECint92 benchmarks. The inner loop iterations of this loops are both control and data dependent on previous iterations. However, each activation of the inner loop (i.e., the outer loop iterations) is independent of the previous one. Hence, it is possible for the compiler to use the proposed fork instruction (starting at outer loop body) to enable a machine to start many activations of the inner loop without waiting for the previous ones to complete, and without unnecessarily discarding executed instructions from the outer loop iterations on misprediction of some control and data-independent iteration of the inner loop.

6. Easing of Register Pressure

Instructions in the control independent basic blocks which are also data in dependent of each other can be not only fetched but executed as well. The obvious question one might ask is why were these data and control independent instructions not percolated up enough to be together in the same basic block? Although a good compiler would try its best to achieve such percolations, it may not always be able to group these instructions together. As mentioned before, to be able to efficiently group together all data and control independent instructions, the compiler needs to have enough architected registers for proper encoding. For example, suppose some hypothetical machine in the example used in FIG. 5, only provides four architecture registers, register 1 through register 4. The compiler for such a machine cannot simply group the control and data independent instructions in basic blocks B1 and B12, without inserting additional spill code. The fork mechanism allows the compiler to convey the underlying data independence without any additional spill code. In fact, some of the existing spill code may become redundant (e.g., the first two loads in basic block B12) if B12 is actually forked at run-time. These spill loads can be optimized away using the SKIP instruction, as explained before.

7. Speculating across control dependent blocks

In the preceding discussion, forks have only been used for parallel execution of control independent blocks. One can further extend the notion to include control dependent blocks. This further implies the ability to do both branch paths speculatively. None of these speculations require further impact on the architecture, although there are additional implementation costs involved. Additional usefulness of this form of speculation, which to some extent (along one branch path) is already in use in current speculative superscalar, needs further examination. Example used in FIG. 6 illustrates the use of fork and suspend instructions for speculating across control dependent blocks, such as blocks B200 and B300, which are both control dependent on B100. The forks in block B100 also let one speculate along both branch paths and appropriately discard instructions based on the actual control flow (either to B200 or B300) at run time.

8. Simplified thread management

Inter-thread synchronization:

The notion of a unique main thread and remaining future threads, offers a simplified mechanism of inter-thread synchronization, implying low overhead. At explicit suspension points, future threads simply suspend themselves and wait for the main thread control to reach them. Alternatively, at different points during its execution, a future thread can attempt explicit inter-thread synchronization with any other thread. But this more elaborate inter-thread synchronization implies more hardware/software overhead.

Inter-thread communication:

The notions of forking with a copy of the architected machine state and the merge operation explained before, offer a mechanism of inter-thread communication with low overhead. Alternative mechanisms with much higher overhead can offer explicit communication primitives which provide continuous communication protocol between active threads, for example, via messages.

Thread scheduling:

The mechanisms proposed in this invention which result in the optional nature of the FORKs (as explained before) also simplify dynamic thread scheduling, as the run-time thread scheduling hardware is not required to schedule (fork) a thread in response to a FORK instruction. Hence, the thread-scheduling hardware does not need to be burdened with queueing and managing the future thread(s) implied by every FORK instruction. This lowered hardware overhead of dynamic thread appealing with respect to the static thread scheduling, due to its other benefits, such as, its adaptability to different machine implementations without recompilation.

Alternative Embodiment 11

The following description describes a forward and backward compatible implementation of multiscalar (multithreaded) processing within illustrative architectures.

Within its branch processor instruction set, the illustrative instruction set architecture ("ISA") includes a local split (fork) instruction. The local split instruction is encoded in branch option ("B0") fields which are otherwise unused. Alternatively, the local split instruction could be encoded in a "no operation" ("NOP") instruction. In response to encountering the local split instruction in the control flow of a programmed instruction sequence, the processor initiates speculative execution of a specified code block (or "set") of instructions.

In this manner, the local split instruction operates as a "hint" to the processor. The local split instruction indicates to the processor that the processor is likely to encounter the specified code block in the control flow at a later moment, and that it would likely be advantageous for the processor to initiate execution of the specified code block speculatively in advance of the later moment. Accordingly, when the processor (a first type of processor) encounters the specified code block in the control flow at the later moment, the processor has already executed at least part of the specified code block, such that the processor executes the specified code block as parallel code. Nevertheless, since the processor executes the specified code block speculatively, the specified code block achieves the effect of sequential code.

In a significant aspect of this illustrative embodiment, the local split instruction is compatible with processing according to less advanced processor architectures. In such a less advanced processor architecture, the processor (a second type of processor) interprets the split instruction simply as an instruction cache line touch instruction. Alternatively, in even less advanced processor architectures, the processor interprets the split instruction as an unconditional branch instruction (or alternatively as a NOP instruction).

In the PowerPC microprocessor architecture, example B0 encodings within a local split instruction are: B0=1z11z, 0011y, or 0111y. In a less advanced processor architecture, these B0 encodings are invalid. Nevertheless, in a significant aspect of this illustrative embodiment, a processor operating according to the less advanced processor architecture does not generate an "invalid operation" interrupt in response to the processor encountering such invalid B0 encodings in the control flow. Instead, in response to encountering such invalid B0 encodings in the control flow, the processor (operating according to the less advanced processor architecture) processes the instructions as if the B0 encodings were 1z1zz, 001zy, or 011zy, respectively.

Accordingly, in a significant aspect of the illustrative embodiment, in response to the procesor (the second type of processor operating according to the less advanced processor architecture) encountering a local split instruction in the control flow, the processor executes a more basic branch function, such that normal instruction processing continues along either the sequential path (a first set of instructions) or the target path (a second set of instructions) but not both.

By comparison, if the processor operates according to the more advanced processor architecture of the illustrative embodiment, the processor (the first type of processor)

operates more advantageously in response to encountering a local split instruction in the control flow. For such a processor, normal instruction execution continues along a selected one (the first set of instructions) of either the target path or the sequential path. Moreover, speculative path instruction execution is initiated along the non-selected path (the second set of instructions), such that the first address along the non-selected path is used as a speculative fetch address. Accordingly, in this situation, the processor executes instructions along two paths concurrently, one path (the first set of instructions) being executed non-speculatively and the other path (the second set of instructions) being executed speculatively. This is distinguishable from the processor that operates according to the less advanced processor architecture, in which only a single path (the first set of instructions) is executed non-speculatively at any particular moment.

According to the more advanced processor architecture of the illustrative embodiment, if the processor encounters multiple local split instructions in the control flow, then the processor is able to execute more than two paths concurrently. In the illustrative embodiment, the semantics of the local split instruction fully support nested split instructions and multiple split instructions from a single non-speculative path.

The advanced processor of the illustrative embodiment does not commit (to architectural registers) the results of any instructions executed along the speculative path until that path becomes non-speculative. Instead, such results are temporarily stored in rename buffers until the results are committed to architectural registers. Consistent with sequential program order, dependencies between the non-speculative and speculative paths are detected and handled by hardware as if the speculative path instructions followed the non-speculative path instructions. In response to the processor fetching all instructions along the non-speculative path, attempting to fetch the first instruction of the speculative path, and committing (to architectural registers) the results of all instructions before the first instruction of the speculative path, the processor commits (to architectural registers) any available results of instructions executed along the speculative path. In this manner, the speculative path becomes non-speculative. The processor does not refetch instructions along the speculative path, because the processor has already executed such instructions. This is referred to as "joining" the speculative path. At any particular moment, there is at most one non-speculative path being executed in a single microprocessor. Nevertheless, the advanced processor of the illustrative embodiment is able to speculatively execute one or more speculative paths concurrently (in parallel) with the non-speculative path. Advantageously, software can be designed independently of the number of speculative paths the processor is able to handle, although optimized software can be designed with reference to the number of speculative paths the processor is able to handle.

Dependency Assumptions and Implementation Issues Relating to Alternative Embodiment 11

For improving performance, the illustrative embodiment supports various protocols. A goal of local split instructions is to provide a software "hint" to the processor about one or more paths of instructions that the processor might encounter after a present non-speculative path of instructions. This is a variation of explicit software branch prediction. This is advantageous because hardware is typically constrained (by resources and cycle time) to a small time window in which to detect opportunities for concurrent processing of multiple instructions in parallel. By comparisons software compilers are normally free to analyze a much larger time window.

Within such a larger time window, relative to hardware, software is further able to analyze more information and to more readily manipulate instruction code sequences for achieving parallelism in execution of multiple instruction paths (or threads).

Alternative Embodiment 11a

In this alternative embodiment, the processor hardware does not rely upon dependency assumptions. Hardware coordinates both register and memory dependencies between the speculative and non-speculative paths. If there are dependencies between the two paths, however, it is possible that little or no performance increase is achieved by implementation of the local split primitive.

In this alternative embodiment, the processor does not store to memory speculatively. It is possible for the processor to include a store queue for speculative stores. The processor also coordinates memory dependencies between concurrently executed speculative and non-speculative code paths. Accordingly, if the processor encounters a store operation in the non-speculative path and a load operation in the speculative path, then the processor resolves the two operations so that the load operation involves the correct information. A processor might perform less optimally if memory aliasing occurs, but this performance aspect of the processor is not negatively affected by implementation of the local split primitive.

The processor further coordinates register dependencies between the speculative and non-speculative paths. The processor hardware detects register dependencies between the two paths and suitably resolves such dependencies. The processor's ability to coordinate register dependencies between the speculative and non-speculative paths is not negatively affected by implementation of the local split primitive.

Alternative Embodiment 11b

In this alternative embodiment, the processor hardware implements various dependency assumptions. Hardware coordinates memory dependencies between the speculative and non-speculative paths. If memory dependencies exist between the two paths, however, it is possible that little or no performance increase is achieved by implementation of the local split primitive.

In this alternative embodiment, the processor does not store to memory speculatively. It is possible for the processor to include a store queue for speculative stores. The processor also coordinates memory dependencies between concurrently executed speculative and non-speculative code paths. Accordingly, if the processor encounters a store operation in the non-speculative path and a load operation in the speculative path, then the processor resolves the two operations so that the load operation involves the correct information. A processor might perform less optimally if memory aliasing occurs, but this performance aspect of the processor is not negatively affected by implementation of the local split primitive.

The processor does not allow register dependencies between the speculative and non-speculative paths. If a program relies upon register dependencies, the processor hardware which implements the local split primitive might produce different results than processor hardware which does not implement the local split primitive.

Alternative Embodiment 11c

In this alternative embodiment, the processor hardware implements more dependency assumptions. The hardware does not coordinate memory dependencies or register dependencies between the speculative and non-speculative paths.

The processor does not store to memory speculatively. It is possible for the processor to include a store queue for speculative stores.

The processor does not allow dependencies between the speculative and non-speculative paths. If a program relies upon such dependencies, the processor hardware which implements the local split primitive might produce different results than processor hardware which does not implement the local split primitive.

Code Structure Examples of Alternative Embodiment 11

Following are examples of code structures (from a control flow perspective) which are suitable for use with the local split primitive.

Figure 7:
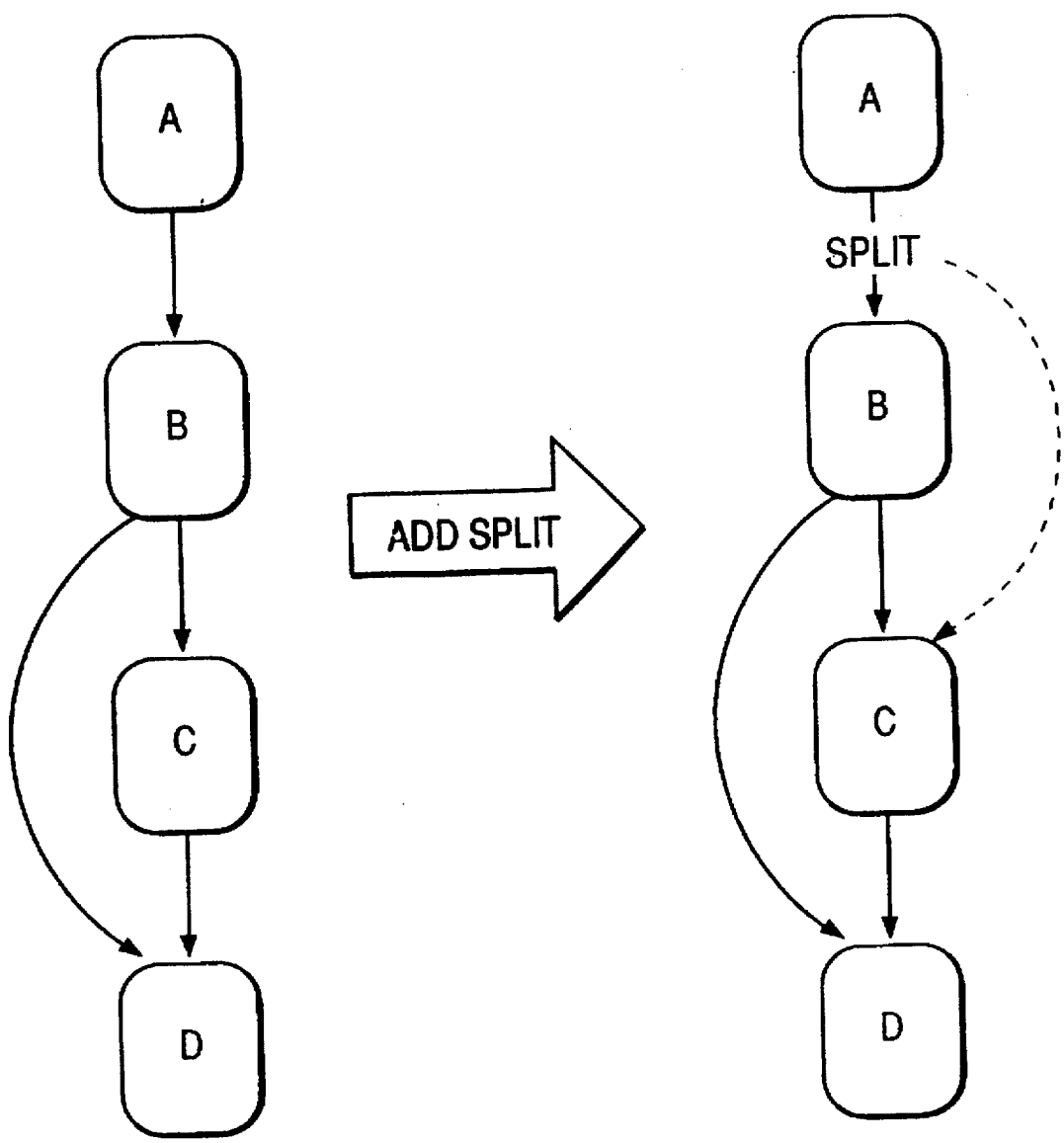
FIG. 7 is an illustration of the manner in which a local split instruction is used for executing two independent strongly connected regions ("SCRs") in parallel.

Referring to FIG. 7, a primary use of the local split primitive is parallel execution of two independent strongly connected regions ("SCRs") of the control flow graph. In FIG. 7, B and C are two independent SCRs. The last instruction in B is a conditional branch instruction for branching around C. A local split instruction is added to the end of A, above B. This local split instruction points to the beginning of C as a target speculative block (the light grey dotted line in FIG. 7 is the speculative path). In this manner, the software instructs the processor hardware to initiate speculative execution of C in parallel with B, regardless of the number of intervening branches or the distance between the initial addresses of the two SCRs B and C. If the conditional branch at the end of B is taken, then no results from speculative execution of C are committed to the processor's architectural registers. But, if the conditional branch at the end of B is not taken, then any speculative results from execution of C are committed to the processor's architectural registers, and the processor continues executing instructions from the path of C. The processor coordinates depencies between B and C.

Figure 8:
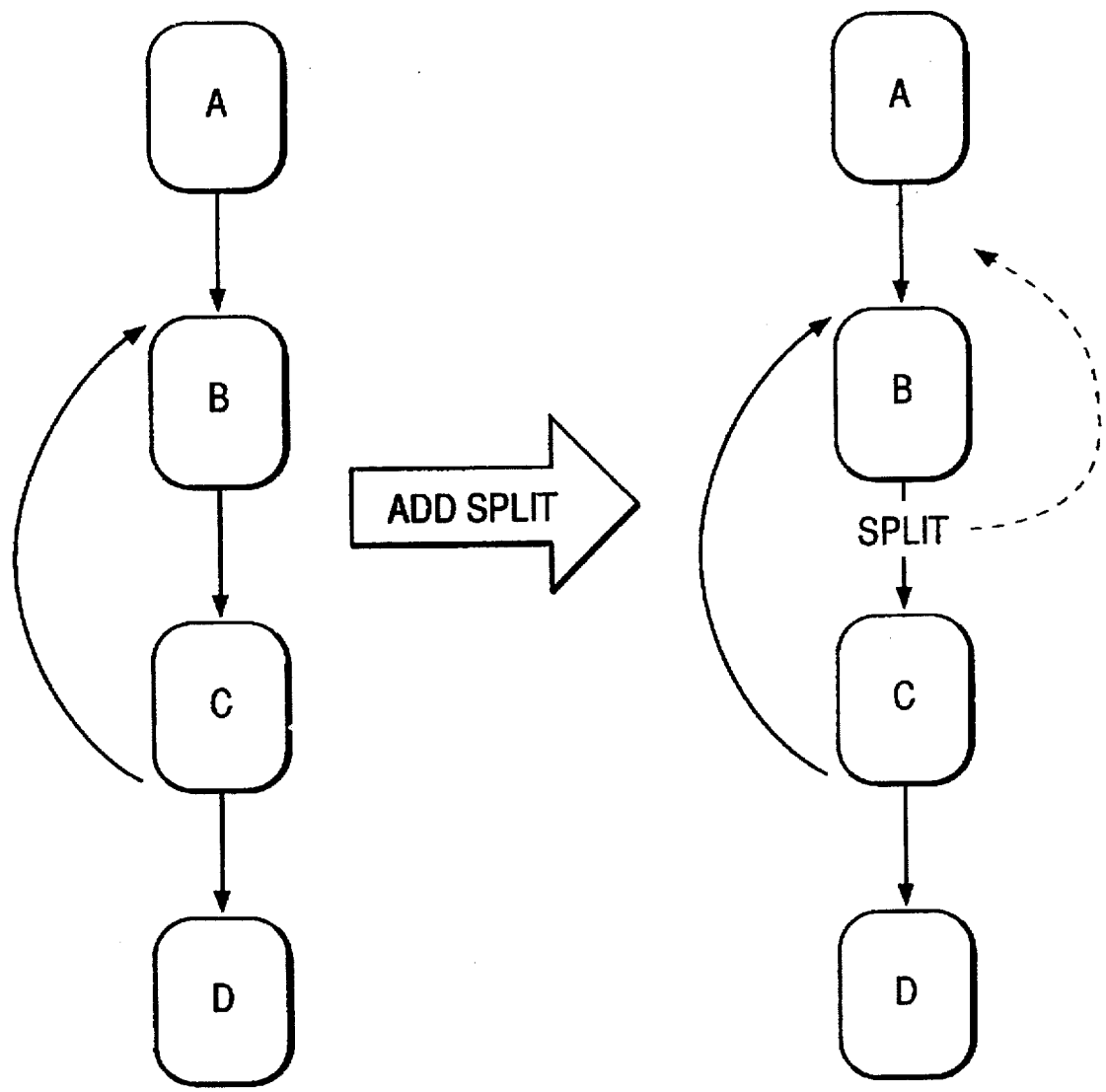
FIG. 8 is an illustration of the manner in which a local split instruction is used for loop unrolling.

Referring to FIG. 8, another use of the local split primitive is loop unrolling. It is possible for interiteration dependencies to be resolved early in the loop. In that case, a local split instruction is useful for unrolling the loop in hardware. The loop is split into two sections, namely B and C. In this example, part B of iteration n+1 (B(n+1)) depends on part B of iteration n (B(n)), but not on part C of iteration n (C(n)). In that situation, B(n+1) can start as soon as B(n) is completed.

An example of this situation is a loop where the processor updates address registers at the start of the loop, then loads data into registers, operates upon the data, and then writes the data back to memory in the second part of the loop. After the address registers are updated, the execution of the next iteration of the loop can be initiated speculatively. In this manner, the processor continues executing instructions despite long latency events. For example, by initiating execution of a single speculative path, the processor is able to initiate iteration n+1 of the loop even if iteration n suffers a cache or translation lookaside buffer ("TLB") miss. If both iteration n and n+1 have cache misses, then a local split instruction can instruct the processor to resolve the misses in parallel rather than in series (through a suitably pipelined bus).

Accordingly, in FIG. 8, a local split instruction is added to the end of B, above C. This local split instruction points to the beginning of B as a target speculative block (the light grey dotted line in FIG. 8 is the speculative path). In this manner, the software instructs the processor hardware to initiate speculative execution of B(n+1) in parallel with C(n). If the loop closing branch is taken, then any speculative results from execution of B(n+1) are committed to the processor's architectural registers, and the processor continues executing instructions from the path of iteration n+1. But, if the loop closing branch is not taken, then no results from speculative execution of iteration n+1 are committed to the processor's architectural registers. The processor coordinates dependencies between B(n+1) and c(n).

Hardware Implementation Example of Alternative Embodiment 11

Following is an example of processor hardware for executing multiple instruction threads in parallel. Various hardware alternatives are possible for implementing the local split technique of the illustrative embodiment. For executing multiple instruction threads in parallel, the instruction cache can be dual-ported; alternatively, as in the following example, the processor arbitrates betweeen the two threads. With the local split primitive according to the illustrative embodiment, it is possible to significantly increase the processor's overall instruction processing throughput by more actively using execution units in a wide superscalar processor implementation.

Figure 9:
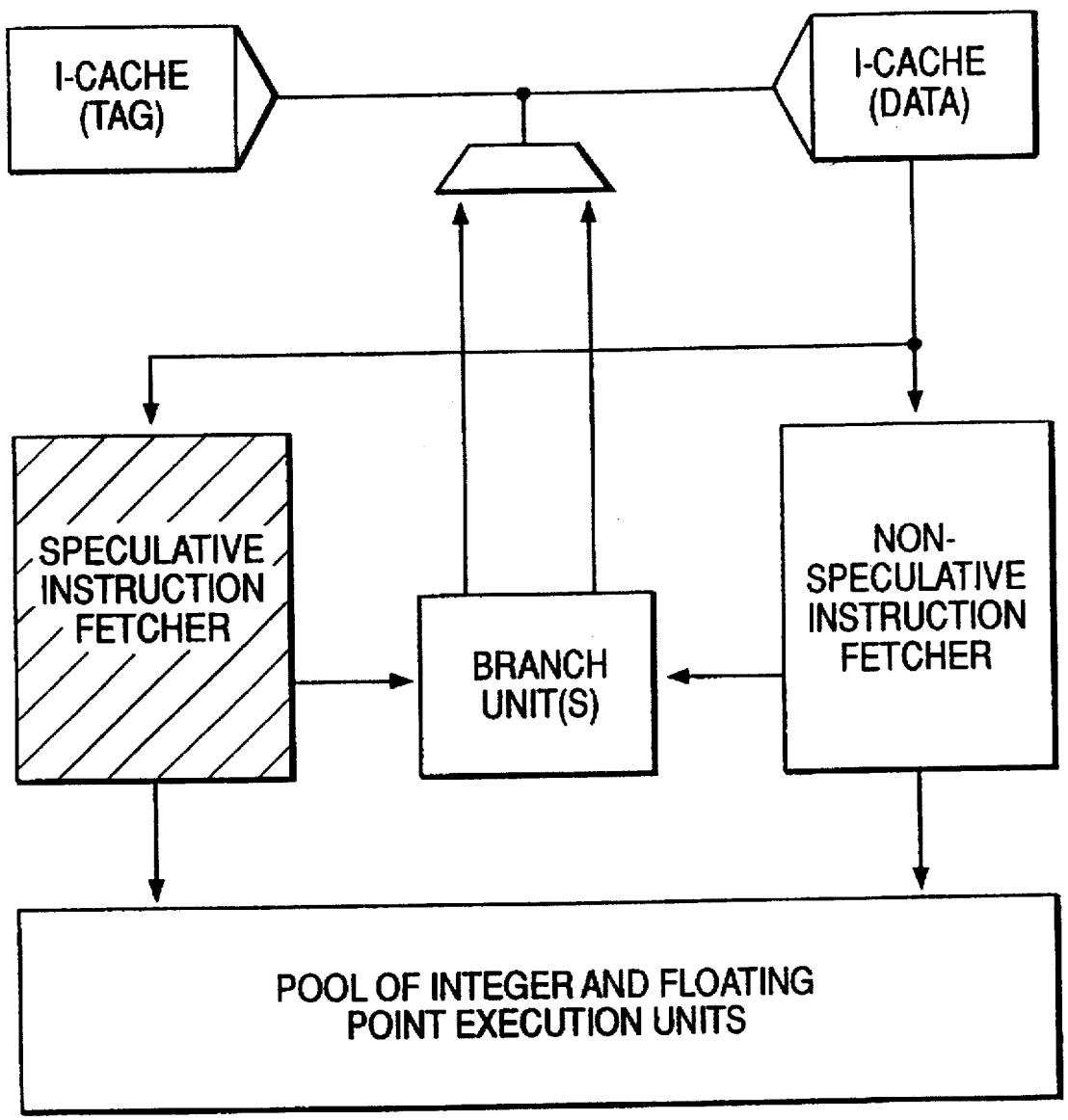
FIG. 9 is a block diagram of an instruction fetch unit according to Alternative Embodiment 11.

Referring to FIG. 9, the instruction fetcher is capable of fetching from two different instruction threads at a time. A one-bit tag is associated with each instruction. The one-bit tag specifies the thread to which its associated instruction belongs. At any particular moment, one of the two threads has higher priority for both instruction fetching and execution resource scheduling because it is considered to be the most likely path.

As the processor executes instructions along the primary fetch path, there are two situations in which the processor initiates execution of a second thread in parallel with a first thread. In the first situation, the processor encounters an unresolved conditional branch, in which case the most likely (predicted) path is fetched in a primary fetcher (non-speculative path instruction fetcher), while the less likely path is fetched in a secondary fetcher (speculative path instruction fetcher). In the second situation, the processor encounters a local split instruction in the primary fetcher. In response to encountering the local split instruction in the primary fetcher, the secondary fetcher is purged (along with any effects of instructions fetched by the secondary fetcher), and the secondary fetcher is reset to the speculative fetch address as specified in the local split instruction. Notably, the processor saves the address of the speculative path instruction thread (resulting from such a split) in a register.

While the processor is speculatively executing an instruction thread, if the processor encounters an additional local split instruction, the processor does not initiate an additional split to a new instruction thread. Instead, the processor continues past the additional local split instruction and processes it in the same manner as a normal branch instruction. This is because no further available fetcher resource is available for the new instruction thread, since the processor includes only two fetchers. Nevertheless, the processor is able to save the new instruction thread address (as specified in the additional local split instruction) and then initiate the additional split when the thread is joined and a free fetcher resource becomes available. The branch unit handles branch processor instructions for both threads (from the primary fetcher and in the secondary fetcher) and generates two fetch addresses per cycle. The processor arbitrates these two fetch addresses into the instruction cache (e.g. an interleaved cache), with the non-speculative address generally having higher priority (depending on the extent to which the queue is full).

Figure 10:
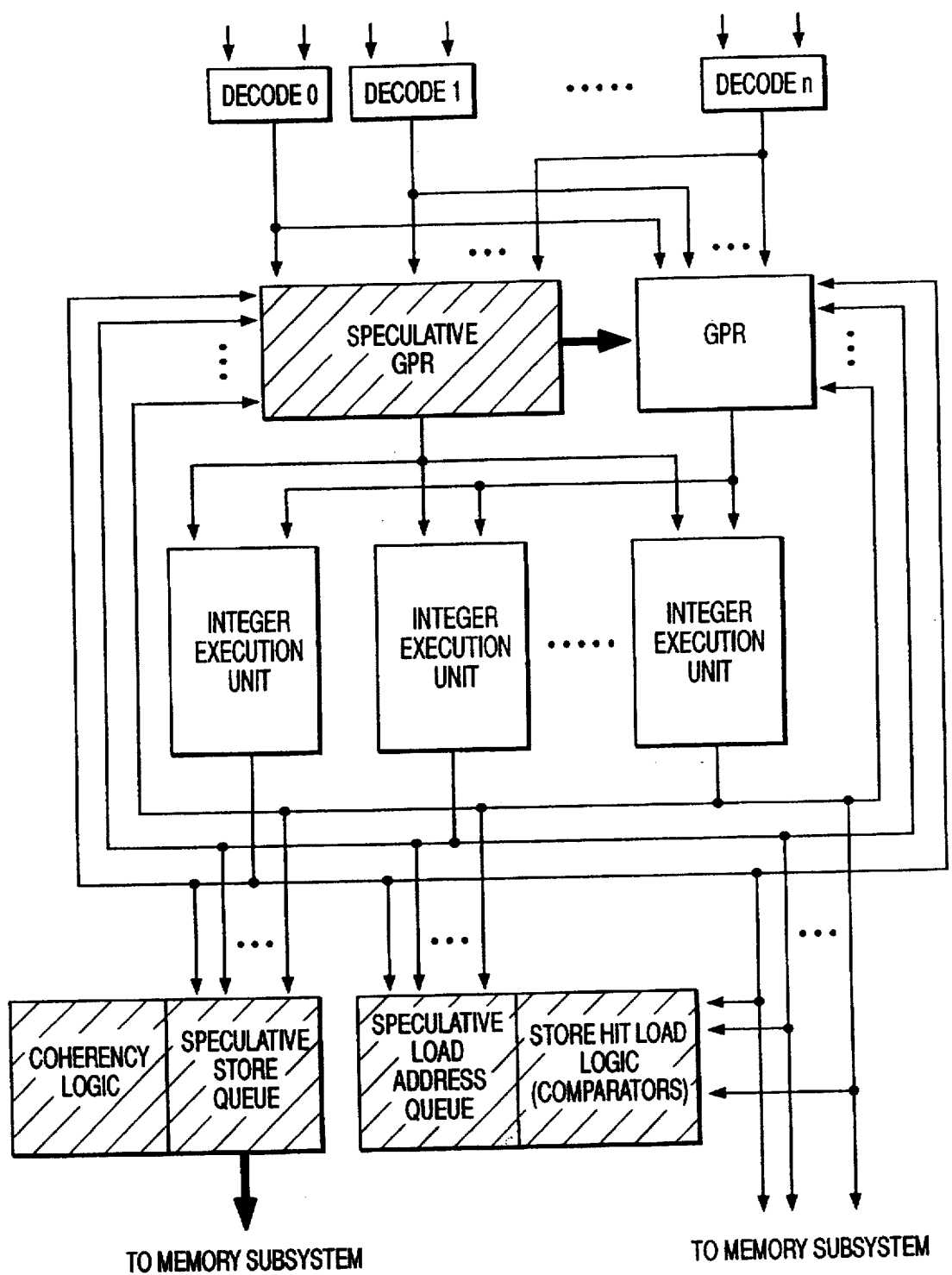
FIG. 10 is a block diagram of completion control logic according to Alternative Embodiment 11.

Referring to FIG. 10, the processor dispatches instructions from instruction queues to multiple integer and floating point execution units. For clarity, FIG. 10 shows only the integer units. If there are n integer execution units, then processor preferably dispatches n integer instructions in a single cycle. During a particular cycle, if only (n-k) instructions are dispatchable from the primary (non-speculative) instruction queue, then the secondary (speculative) queue dispatches k instructions to fill in the "holes". In this manner, the processor achieves higher overall throughput by more fully using its resources during otherwise idle cycles. Notably, the execution time of the primary (non-speculative) path is not increased relative to maximum performance achieved a similar processor without the ability to handle a second thread. A typical processor with two or more integer execution units and a branch unit achieves an average IPC of 1 to 1.5 (for integer code), such that (on average) greater than 0.5 idle execution units exist in such a processor. Adding additional execution units may be advantageous if there is a technique for keeping them busy.

When the processor dispatches an instruction, the processor assigns a tag to the instruction. The tag identifies the path from which the instruction originated. Moreover, the tag is marked to indicate whether the instruction is part of a speculatively executed path or a non-speculatively executed path. When the processor's completion unit completes an instruction from a non-speculatively executed path, the processor writes the instruction's result(s) back to the processor's architectural general purpose registers ("GPRs") or to memory. When the completion unit completes an instruction from a speculatively executed path, the processor stores the instruction's result(s) in shadow register(s).

In this example, the shadow structures are a speculative GPR and a speculative store queue. When a path changes from speculative to non-speculative, the processor commits results (stored in the shadow structures) of the patch's instructions, such that the speculative GPR is copied into the architectural GPR and such that the speculative store queue is copied into memory. The processor maintains memory coherency of the speculative store queue. If the store queue is full and the processor encounters a store instruction in a speculatively executed path, then the processor does not execute the speculative store instruction; instead, the processor stalls execution of the speculative path until the speculative path can be joined (at which time the processor copies the store queue to memory) or cancelled (at which time the processor purges the store queue).

In this example, the processor further detects and recovers from data dependencies between the speculatively and non-speculatively executed paths. For this purpose, the processor monitors registers which have been read speculatively and memory addresses which have been read speculatively so that the processor detects dependencies.

In one example, in response to the processor detecting a dependency, the processor merely discards the speculative path. In a more preferred example, the processor discards the speculative path and then reexecutes the same speculative path from the speculative path's beginning (i.e. the speculative target address of the local split instruction). The processor earlier stored this speculative target address in its machine state as the path tag used as the join address. These two examples have the same shortcoming: there is no explicit synchronization mechanism for software to identify the end of the independent block of code; accordingly, it is possible for the processor to fetch and execute dependent instructions, thereby resulting in the entire speculative path being discarded. This results in a difficult scheduling issue, because (according to these two examples) software needs to schedule the local split instruction sufficiently early to allow some speculative execution of the independent code, but sufficiently late so that speculative execution does not extend into instructions having data dependencies before the paths are joined or the dependencies are resolved.

In the illustrative embodiment, the minimum requirement for dependency recovery is as follows. The data dependency graph of a program can be viewed as a partial ordering of instructions with '<' where A<B (A less than B) implies that either A depends on B or there exists C such that A depends on C and C<B. Preferably, when a dependency is detected, the processor reexecutes only those instructions which precede the instruction causing the dependency. Notably, control dependencies define a different partial ordering of instructions, and if a reexecuted instruction takes a different control path, then the processor suitably handles control dependencies (e.g. precise interrupts and branches are suitably handled). Accordingly, in the illustrative embodiment, the processor reexecutes only those instructions affected by the dependency. This relieves the scheduling issue described above.

Summery of Alternative Embodiment 11

The local split instruction is a primitive used for unlocking parallelism by enabling the processor to process multiple independent instruction paths without prohibitively complicated and expensive hardware. With this primitive, compiled software is able to specify independent paths for the processor hardware to execute in parallel. Advantageously, this primitive can be added to an existing instruction set architecture ("ISA") to unlock finely grained parallelism.

This technique achieves several advantages. First, this technique achieves consistency with fundamental concepts of a previously existing ISA. Seconds this technique achieves forward and backward compatability; accordingly, regardless of whether compiled software includes or excludes the local split primitive, such software is executable (without recompilation) by any processor consistent with the previously existing ISA, regardless of whether the processor is sufficiently advanced to execute the local split primitive itself. Third, where compiled software includes the local split primitive, such software is executable (without recompilation) by a processor which is not sufficiently advanced to execute the local split primitive itself, with little or no performance degradation compared to compiled software which excludes the local split primitive.

Although an illustrative embodiment of the present inventions and their advantages have been described in detail hereinabove, it has been described as example and not as limitation. Various changes, substitutions and alterations can be made in the illustrative embodiment without departing from the breadth, scope and spirit of the present inventions. The breadth, scope and spirit of the present inventions should not be limited by the illustrative embodiment, but should be defined only in accordance with the following claims and equivalents thereof.

What is claimed is:

1. A method of processing instruction threads, comprising the steps of:

initiating execution by a processing system of a first set of instructions including a particular instruction, said particular instruction including an indication of a second set of instructions;

in response to execution of said particular instruction and to said processing system being of a first type, continuing execution by said processing system of said first set while initiating execution of said second set; and in response to execution of said particular instruction and to said processing system being of a second type, continuing execution by said processing system of said first set without initiating execution of said second set.

2. The method of claim 1 wherein said step of continuing execution by said processing system of said first set while initiating execution of said second set comprises the step of initiating speculative execution of said second set.

3. The method of claim 2 and further comprising the step of, in response to one or more results of execution of said first set, selectively committing one or more results of said speculative execution of said second set to one or more architectural registers.

4. The method of claim 1 wherein said particular instruction is encoded in a branch instruction.

5. The method of claim 1 wherein said particular instruction is encoded in a NOP instruction.

6. The method of claim 1 wherein said step of continuing execution by said processing system of said first set without initiating execution of said second set comprises the step of executing said particular instruction as an instruction cache line touch instruction.

7. The method of claim 1 wherein said step of continuing execution by said processing system of said first set without initiating execution of said second set comprises the step of executing said particular instruction as an unconditional branch instruction.

8. The method of claim 1 wherein said step of continuing execution by said processing system of said first set without initiating execution of said second set comprises the step of executing said particular instruction as a NOP instruction.

9. A system for processing instruction threads, comprising:

a processing system including circuitry for:

initiating execution by said processing system of a first set of instructions including a particular instruction, said particular instruction including an indication of a second set of instructions;

in response to execution of said particular instruction and to said processing system being of a first type, continuing execution by said processing system of said first set while initiating execution of said second set; and in response to execution of said particular instruction and to said processing system being of a second type, continuing execution by said processing system of said first set without initiating execution of said second set.

10. The system of claim 9 wherein said processing system is of said first type and speculatively executes said second set.

11. The system of claim 10 wherein said processing system is further operable to selectively commit one or more results of said speculative execution of said second set to one or more architectural registers in response to one or more results of execution of said first set.

12. The system of claim 9 wherein said particular instruction is encoded in a branch instruction.

13. The system of claim 9 wherein said particular instruction is encoded in a NOP instruction.

14. The system of claim 9 wherein said processing system is of said second type and executes said particular instruction as an instruction cache line touch instruction.

15. The system of claim 9 wherein said processing system is of said second type and executes said particular instruction as an unconditional branch instruction.

16. The system of claim 9 wherein said processing system is of said second type and executes said particular instruction as a NOP instruction.

* * * * *